United States Patent
Lawson et al.

(10) Patent No.: US 9,413,852 B2
(45) Date of Patent: Aug. 9, 2016

(54) TIME-STAMPING OF INDUSTRIAL CLOUD DATA FOR SYNCHRONIZATION

(71) Applicant: Rockwell Automation Technologies, Inc., Mayfield Heights, OH (US)

(72) Inventors: Douglas C. Lawson, Silverado, CA (US); Douglas J. Reichard, Fairview Park, OH (US); Joseph A. Harkulich, Willoughby, OH (US); Rainer Hessmer, Rancho Santa Margarita, CA (US); Sujeet Chand, Brookfield, WI (US); David W. Farchmin, Grafton, WI (US)

(73) Assignee: ROCKWELL AUTOMATION TECHNOLOGIES, INC., Mayfield Heights, OH (US)

(*) Notice: Subject to any disclaimer, the term of this patent is extended or adjusted under 35 U.S.C. 154(b) by 656 days.

(21) Appl. No.: 13/725,619

(22) Filed: Dec. 21, 2012

(65) Prior Publication Data

US 2013/0212420 A1    Aug. 15, 2013

Related U.S. Application Data

(60) Provisional application No. 61/587,531, filed on Feb. 9, 2012.

(51) Int. Cl.
   *G06F 15/16*  (2006.01)
   *H04L 29/06*  (2006.01)
   (Continued)

(52) U.S. Cl.
   CPC .............. *H04L 67/42* (2013.01); *G05B 11/01* (2013.01); *G05B 19/4185* (2013.01); *G06F 1/12* (2013.01);
   (Continued)

(58) Field of Classification Search
   CPC .............. G05B 19/4185; G05B 11/01; G05B 2219/31334; G05B 2219/31326; G06F 17/30545; G06F 1/12; G06F 17/30233; G06F 1/14; G06F 9/5072; G06F 17/30867; G06F 17/30554; H04L 67/42; H04L 67/16; Y02P 80/114; Y02P 90/18; Y02P 90/16
   USPC .................................. 709/223, 246, 248, 250
   See application file for complete search history.

(56) References Cited

U.S. PATENT DOCUMENTS

| 5,014,317 A | 5/1991 | Kita et al. |
|---|---|---|
| 5,122,948 A | 6/1992 | Zapolin |

(Continued)

FOREIGN PATENT DOCUMENTS

| CN | 101114160 | 1/2008 |
|---|---|---|
| CN | 101536002 | 9/2009 |

(Continued)

OTHER PUBLICATIONS

Office Action dated Jun. 18, 2014 for U.S. Appl. No. 13/725,578, 13 pages.

(Continued)

*Primary Examiner* — Oanh Duong
(74) *Attorney, Agent, or Firm* — Amin, Turocy & Watson, LLP

(57) ABSTRACT

A cloud-capable industrial device that provides time-stamped industrial data to a cloud platform is provided. The industrial device collects or generates industrial data in connection with monitoring and/or controlling an automation system, and includes a cloud interface that couples the industrial device to one or more cloud-based services running on a cloud platform. The industrial device can apply time stamps to respective items of industrial data reflecting a time that the data was measured or generated prior to providing the data to the cloud platform. To accurately reflect temporal relationships between data sets provided to the cloud platform from different locations and time zones, the industrial device can synchronize its internal clock with a clock associated with the cloud platform.

28 Claims, 20 Drawing Sheets

(51) Int. Cl.

| | | |
|---|---|---|
| *G05B 11/01* | (2006.01) | |
| *G06F 17/30* | (2006.01) | |
| *H04L 29/08* | (2006.01) | |
| *G06F 1/12* | (2006.01) | |
| *G05B 19/418* | (2006.01) | |
| *G06F 1/14* | (2006.01) | |
| *G06F 9/50* | (2006.01) | |

(52) U.S. Cl.
CPC .............. *G06F 1/14* (2013.01); *G06F 9/5072* (2013.01); *G06F 17/30233* (2013.01); *G06F 17/30545* (2013.01); *G06F 17/30554* (2013.01); *G06F 17/30867* (2013.01); *H04L 67/16* (2013.01); *G05B 2219/31326* (2013.01); *G05B 2219/31334* (2013.01); *Y02P 80/114* (2015.11); *Y02P 90/16* (2015.11); *Y02P 90/18* (2015.11); *Y02P 90/185* (2015.11)

(56) References Cited

U.S. PATENT DOCUMENTS

| | | |
|---|---|---|
| 5,199,009 A | 3/1993 | Svast |
| 5,611,059 A | 3/1997 | Benton et al. |
| 5,612,869 A | 3/1997 | Letzt et al. |
| 5,682,460 A | 10/1997 | Hyziak et al. |
| 5,710,885 A | 1/1998 | Bondi |
| 5,844,794 A | 12/1998 | Keeley |
| 5,845,149 A | 12/1998 | Husted et al. |
| 5,856,931 A | 1/1999 | McCasland |
| 5,978,568 A | 11/1999 | Abraham et al. |
| 6,167,337 A | 12/2000 | Haack |
| 6,175,770 B1 | 1/2001 | Bladow |
| 6,199,068 B1 | 3/2001 | Carpenter |
| 6,279,113 B1 | 8/2001 | Vaidya |
| 6,324,607 B1 | 11/2001 | Korowitz et al. |
| 6,381,502 B1 | 4/2002 | Rudder et al. |
| 6,400,996 B1 | 6/2002 | Hoffberg et al. |
| 6,412,032 B1 | 6/2002 | Neet et al. |
| 6,437,692 B1 | 8/2002 | Petite et al. |
| 6,457,024 B1 | 9/2002 | Felsentein et al. |
| 6,463,338 B1 | 10/2002 | Neet |
| 6,535,926 B1 | 3/2003 | Esker |
| 6,624,388 B1 | 9/2003 | Blankenship et al. |
| 6,640,145 B2 | 10/2003 | Hoffberg et al. |
| 6,651,062 B2 | 11/2003 | Ghannam et al. |
| 6,675,226 B1 | 1/2004 | Nair et al. |
| 6,686,838 B1 | 2/2004 | Rezvani et al. |
| 6,691,159 B1 | 2/2004 | Grewal et al. |
| 6,708,074 B1 | 3/2004 | Chi et al. |
| 6,714,974 B1 | 3/2004 | Machida |
| 6,728,262 B1 | 4/2004 | Woram |
| 6,732,165 B1 | 5/2004 | Jennings, III |
| 6,732,191 B1 | 5/2004 | Baker et al. |
| 6,774,598 B1 * | 8/2004 | Kohler .................. G05B 19/41 318/561 |
| 6,801,920 B1 | 10/2004 | Wischinski |
| 6,819,960 B1 | 11/2004 | McKelvey et al. |
| 6,891,850 B1 | 5/2005 | Vandesteeg et al. |
| 6,895,532 B2 | 5/2005 | Raynham |
| 6,904,600 B1 | 6/2005 | James et al. |
| 6,907,302 B2 | 6/2005 | Karbassi |
| 6,920,502 B2 | 7/2005 | Araujo et al. |
| 6,965,802 B2 | 11/2005 | Sexton |
| 6,968,242 B1 | 11/2005 | Hwu et al. |
| 6,970,913 B1 | 11/2005 | Albert et al. |
| 6,982,953 B1 | 1/2006 | Swales |
| 7,032,045 B2 | 4/2006 | Kostadinov |
| 7,085,814 B1 | 8/2006 | Gandhi et al. |
| 7,103,428 B2 | 9/2006 | Varone et al. |
| 7,133,900 B1 | 11/2006 | Szeto |
| 7,149,792 B1 | 12/2006 | Hansen et al. |
| 7,151,966 B1 | 12/2006 | Baier et al. |
| 7,203,560 B1 | 4/2007 | Wylie et al. |
| 7,210,095 B1 | 4/2007 | Mor |
| 7,233,830 B1 | 6/2007 | Callaghan et al. |
| 7,275,037 B2 | 9/2007 | Lauer |
| 7,277,865 B1 | 10/2007 | Silverstone et al. |
| 7,289,994 B2 | 10/2007 | Nixon et al. |
| 7,310,344 B1 | 12/2007 | Sue |
| 7,383,155 B2 | 6/2008 | Rosam et al. |
| 7,412,548 B2 | 8/2008 | Sichner |
| 7,478,010 B2 | 1/2009 | Hashemian |
| 7,480,728 B2 * | 1/2009 | Evans ................. H04N 21/2368 375/E7.271 |
| 7,539,724 B1 | 5/2009 | Callaghan |
| 7,734,590 B2 * | 6/2010 | Chand et al. .................. 707/636 |
| 8,150,959 B1 | 4/2012 | Bezdicek et al. |
| 8,353,012 B2 | 1/2013 | Del Real |
| 8,392,845 B2 | 3/2013 | Cahill et al. |
| 8,451,753 B2 | 5/2013 | Vanga et al. |
| 8,468,272 B2 | 6/2013 | Giroti |
| 8,686,871 B2 | 4/2014 | Jensen et al. |
| 9,024,955 B2 | 5/2015 | Ramarao et al. |
| 2002/0004798 A1 | 1/2002 | Babula et al. |
| 2002/0016839 A1 | 2/2002 | Smith |
| 2002/0042756 A1 | 4/2002 | Kumar et al. |
| 2002/0046239 A1 | 4/2002 | Stawikowski et al. |
| 2002/0049833 A1 | 4/2002 | Kikinis |
| 2002/0065898 A1 | 5/2002 | Leontiev et al. |
| 2002/0068983 A1 | 6/2002 | Sexton |
| 2002/0073236 A1 | 6/2002 | Helgeron et al. |
| 2002/0077711 A1 | 6/2002 | Nixon et al. |
| 2002/0094588 A1 | 7/2002 | Fan et al. |
| 2002/0107904 A1 | 8/2002 | Talluri et al. |
| 2002/0156872 A1 | 10/2002 | Brown |
| 2002/0156926 A1 | 10/2002 | Batke |
| 2002/0161745 A1 | 10/2002 | Call |
| 2002/0169993 A1 * | 11/2002 | Woods et al. .................. 713/400 |
| 2003/0004937 A1 | 1/2003 | Salmenkaita et al. |
| 2003/0009253 A1 | 1/2003 | McIntyre et al. |
| 2003/0009572 A1 | 1/2003 | Thurner |
| 2003/0014149 A1 | 1/2003 | Kreidler et al. |
| 2003/0023336 A1 | 1/2003 | Kreidler et al. |
| 2003/0051074 A1 | 3/2003 | Edwards |
| 2003/0056224 A1 | 3/2003 | Stone |
| 2003/0105535 A1 | 6/2003 | Rammler |
| 2003/0109942 A1 | 6/2003 | Yeh et al. |
| 2003/0120817 A1 | 6/2003 | Ott et al. |
| 2003/0156639 A1 | 8/2003 | Liang |
| 2003/0167238 A1 | 9/2003 | Zeif |
| 2003/0167449 A1 | 9/2003 | Warren et al. |
| 2003/0177169 A1 | 9/2003 | Nutt et al. |
| 2003/0177201 A1 | 9/2003 | Shen |
| 2003/0208545 A1 | 11/2003 | Eaton et al. |
| 2003/0217100 A1 | 11/2003 | Kronk |
| 2003/0224769 A1 | 12/2003 | Solve et al. |
| 2003/0236576 A1 | 12/2003 | Resnick et al. |
| 2004/0111512 A1 | 6/2004 | Barth |
| 2004/0148187 A1 | 7/2004 | Boettcher et al. |
| 2004/0148383 A1 | 7/2004 | Gonsalves |
| 2004/0214566 A1 | 10/2004 | Suzuki et al. |
| 2004/0215551 A1 | 10/2004 | Eder |
| 2004/0225629 A1 | 11/2004 | Eder |
| 2004/0267729 A1 | 12/2004 | Swaminathan et al. |
| 2005/0038528 A1 | 2/2005 | McKlvey et al. |
| 2005/0055429 A1 | 3/2005 | Abele |
| 2005/0080799 A1 | 4/2005 | Hamden et al. |
| 2005/0120112 A1 | 6/2005 | Wing et al. |
| 2005/0125441 A1 | 6/2005 | Clemens et al. |
| 2005/0149922 A1 | 7/2005 | Vincent |
| 2006/0022048 A1 | 2/2006 | Johnson |
| 2006/0046712 A1 | 3/2006 | Shamp et al. |
| 2006/0149813 A1 | 7/2006 | Janik |
| 2006/0153089 A1 | 7/2006 | Silverman |
| 2006/0173873 A1 | 8/2006 | Prompt et al. |
| 2006/0253205 A1 | 11/2006 | Gardiner |
| 2007/0019641 A1 | 1/2007 | Pai et al. |
| 2007/0050206 A1 | 3/2007 | Whikehart et al. |
| 2007/0061018 A1 | 3/2007 | Callaghan et al. |
| 2007/0073850 A1 | 3/2007 | Callaghan et al. |
| 2007/0118560 A1 | 5/2007 | Bornhoevd et al. |
| 2007/0192213 A1 | 8/2007 | Wu et al. |
| 2007/0194097 A1 | 8/2007 | Jones |

(56) References Cited

U.S. PATENT DOCUMENTS

| | | | |
|---|---|---|---|
| 2007/0247789 | A1* | 10/2007 | Benson et al. ............... 361/672 |
| 2008/0027704 | A1 | 1/2008 | Kephart |
| 2008/0125887 | A1 | 5/2008 | Case |
| 2008/0155064 | A1 | 6/2008 | Kosuge |
| 2008/0189637 | A1 | 8/2008 | Krajewski et al. |
| 2008/0208365 | A1 | 8/2008 | Grgic et al. |
| 2008/0263514 | A1 | 10/2008 | DeMesa |
| 2009/0086692 | A1 | 4/2009 | Chen |
| 2009/0089233 | A1 | 4/2009 | Gach et al. |
| 2009/0089359 | A1 | 4/2009 | Siorek et al. |
| 2009/0089682 | A1 | 4/2009 | Baier |
| 2009/0109889 | A1 | 4/2009 | Budampati et al. |
| 2009/0127325 | A1* | 5/2009 | Macurek et al. ............... 235/375 |
| 2009/0210071 | A1 | 8/2009 | Agrusa et al. |
| 2009/0210814 | A1 | 8/2009 | Agrusa et al. |
| 2009/0216341 | A1 | 8/2009 | Enkerud et al. |
| 2010/0076575 | A1 | 3/2010 | Vasko et al. |
| 2010/0082129 | A1 | 4/2010 | McGreevy et al. |
| 2010/0082453 | A1 | 4/2010 | Speers et al. |
| 2010/0083232 | A1 | 4/2010 | Chouinard et al. |
| 2010/0118895 | A1* | 5/2010 | Radulescu ............... 370/503 |
| 2010/0153487 | A1 | 6/2010 | Greven et al. |
| 2010/0192144 | A1 | 7/2010 | Schmit |
| 2010/0241260 | A1* | 9/2010 | Kilibarda et al. ............... 700/95 |
| 2010/0256795 | A1 | 10/2010 | McLaughlin et al. |
| 2010/0257227 | A1 | 10/2010 | McLaughlin |
| 2010/0257228 | A1 | 10/2010 | Staggs et al. |
| 2011/0016058 | A1 | 1/2011 | Pinchuk |
| 2011/0047230 | A1* | 2/2011 | McGee ............... 709/206 |
| 2011/0276498 | A1 | 11/2011 | Madhik |
| 2012/0054246 | A1 | 3/2012 | Fischer |
| 2012/0072597 | A1 | 3/2012 | Teather et al. |
| 2012/0083906 | A1 | 4/2012 | Weatherhead et al. |
| 2012/0084400 | A1 | 4/2012 | Almadi et al. |
| 2012/0089920 | A1* | 4/2012 | Eick ............... 715/739 |
| 2012/0147894 | A1 | 6/2012 | Mulligan et al. |
| 2012/0232876 | A1 | 9/2012 | Misra |
| 2012/0262069 | A1* | 10/2012 | Reed ............... 315/130 |
| 2012/0290104 | A1 | 11/2012 | Holt et al. |
| 2012/0304007 | A1 | 11/2012 | Hanks et al. |
| 2012/0306620 | A1 | 12/2012 | Karaffa et al. |
| 2013/0012220 | A1 | 1/2013 | Waris et al. |
| 2013/0018696 | A1 | 1/2013 | Meldrum |
| 2013/0036198 | A1 | 2/2013 | Galm et al. |
| 2013/0041705 | A1 | 2/2013 | Hampapur et al. |
| 2013/0097710 | A1 | 4/2013 | Basavapatna et al. |
| 2013/0107772 | A1 | 5/2013 | Splitz et al. |
| 2013/0111034 | A1 | 5/2013 | Upadhya |
| 2013/0117806 | A1 | 5/2013 | Parthasarathy et al. |
| 2013/0138812 | A1 | 5/2013 | Assuncao et al. |
| 2013/0138818 | A1 | 5/2013 | Wolf |
| 2013/0145033 | A1 | 6/2013 | Polla et al. |
| 2013/0182107 | A1 | 7/2013 | Anderson |
| 2013/0204982 | A1 | 8/2013 | Kim et al. |
| 2013/0211547 | A1 | 8/2013 | Buchdunger et al. |
| 2013/0212420 | A1 | 8/2013 | Lawson et al. |
| 2013/0304237 | A1 | 11/2013 | Schroeder et al. |
| 2013/0325545 | A1 | 12/2013 | Mordvinova et al. |
| 2014/0047107 | A1 | 2/2014 | Maturana et al. |
| 2014/0156032 | A1 | 6/2014 | Jenkins et al. |
| 2014/0156584 | A1 | 6/2014 | Motukuri et al. |
| 2014/0279948 | A1 | 9/2014 | Mahate et al. |
| 2014/0335480 | A1 | 11/2014 | Asenjo et al. |
| 2014/0336785 | A1 | 11/2014 | Asenjo et al. |
| 2014/0336786 | A1 | 11/2014 | Asenjo et al. |
| 2014/0336795 | A1 | 11/2014 | Asenjo et al. |
| 2014/0337000 | A1 | 11/2014 | Asenjo et al. |
| 2015/0012763 | A1 | 1/2015 | Cohen et al. |
| 2015/0019191 | A1* | 1/2015 | Maturana et al. ............... 703/13 |
| 2015/0304193 | A1 | 10/2015 | Ishii et al. |
| 2015/0378356 | A1 | 12/2015 | Hefeeda et al. |

FOREIGN PATENT DOCUMENTS

| | | |
|---|---|---|
| CN | 101739007 | 6/2010 |
| CN | 102449567 A | 5/2012 |
| CN | 102927937 | 2/2013 |
| DE | 19834456 | 2/2000 |
| EP | 1209558 A2 | 5/1996 |
| EP | 1531373 A2 | 5/2005 |
| EP | 1686442 A1 | 8/2006 |
| EP | 2189900 A1 | 5/2010 |
| EP | 2293164 A1 | 3/2011 |
| EP | 2453326 | 5/2012 |
| WO | 0111586 A | 2/2001 |
| WO | 0169329 A2 | 9/2001 |
| WO | 02/17131 | 2/2002 |
| WO | 03058506 A1 | 7/2003 |
| WO | 2008133715 | 11/2008 |
| WO | 2009046095 | 4/2009 |
| WO | 2013007866 A1 | 1/2013 |

OTHER PUBLICATIONS

Office Action dated Aug. 19, 2014 for U.S. Appl. No. 13/615,195, 22 pages.
European Search Report dated Aug. 11, 2014 for European Application No. 14167706.2-1955, 7 pages.
European Search Report dated Aug. 11, 2014 for European Application No. 14167714.6-1955, 5 pages.
European Search Report dated Aug. 11, 2014 for European Application No. 14167626.2-1955, 9 pages.
European Search Report dated Aug. 11, 2014 for European Application No. 14167627.0-1955, 6 pages.
European Search Report dated Aug. 11, 2014 for European Application No. 14167703.9-1955, 7 pages.
European Search Report dated Aug. 11, 2014 for European Application No. 14167707.0-1955, 7 pages.
European Search Report dated Aug. 11, 2014 for European Application No. 14167708.8-1955, 5 pages.
European Search Report dated Aug. 11, 2014 for European Application No. 14167712.0-1955, 5 pages.
European Search Report dated Aug. 11, 2014 for European Application No. 14167511.6-1955, 6 pages.
Compuquest, Inc., SpreadMsg Lite—Data Capture, Scanning, Extraction & Rule Based Instant Messaging Software, http://web.archive.org/web/20020813080848/ http://www.compuquestinc.com/spmsgl.html, retrieved Jul. 21, 2006, 6 pages.
Office Action dated Oct. 9, 2014 for U.S. Appl. No. 13/725,543, 10 pages.
Office Action dated Dec. 12, 2014 for U.S. Appl. No. 13/725,578, 24 pages.
Office Action dated Dec. 27, 2004 for U.S. Appl. No. 10/162,315, 8 pages.
Office Action dated Jun. 15, 2005 for U.S. Appl. No. 10/162,315, 9 pages.
Office Action dated Sep. 9, 2005 for U.S. Appl. No. 10/162,315, 10 pages.
Vasudevan, A Web Services Primer, Apr. 4, 2001, XML.com, http://webservices.xml.com/pub/a/ws/2001/04/04/webservices/index.html.
Office Action dated Mar. 6, 2006 for U.S. Appl. No. 10/162,315, 8 pages.
W3C, Web Services Description Language, http://www.w3.org/TR/wsdl, Mar. 15, 2001.
European Search Report dated Mar. 18, 2004 for European Patent Application Serial No. 03026339, 3 Pages.
Compuquest, Inc., SPM-IM-Instant Messaging Client for SpreadMsg Wireless Messaging Software, http://www.compuquestinc.com/spmim.html, Aug. 13, 2002.
Compuquest, Inc., SpreadMsg Lite—Data Capture, Scanning, Extraction & Rule Based Instant Messaging Software, http://web.archive.org/web/20020813080848/ http://www.compuquestinc.com/spmsgl.html.

(56) References Cited

OTHER PUBLICATIONS

International Business Machines Corporation, Cross platform instant messaging using web services, Research Disclosure, Kenneth Mason Publications, Hampshire, GB, vol. 458, No. 156, Jun. 2002.
Office Action dated Jan. 20, 2015 for U.S. Appl. No. 13/615,195, 22 pages.
Third Party Submission under 37 CFR 1.290 dated Nov. 21, 2014 for U.S. Appl. No. 14/087,873, 23 pages.
Office Action for U.S. Appl. No. 13/725,543 dated May 20, 2015, 15 pages.
Office Action for U.S. Appl. No. 13/608,821 dated Jun. 1, 2015, 44 pages.
Office Action for U.S. Appl. No. 13/608,850 dated Jun. 1, 2015, 38 pages.
Office Action for U.S. Appl. No. 13/677,060 dated Apr. 24, 2015, 54 pgs.
Office Action dated Nov. 25, 2015 for U.S. Appl. No. 14/087,873, 57 pages.
Final Office Action for U.S. Appl. No. 13/608,821 dated Dec. 7, 2015, 39 pages.
Final Office Action for U.S. Appl. No. 13/615,195, dated Feb. 11, 2016, 19 pages.
Non-Final Office Action for U.S. Appl. No. 13/725,543, dated Feb. 2, 2016, 15 pages.
Non-Final Office Action for U.S. Appl. No. 13/725,660, dated Jan. 21, 2016, 72 pages.
Final Office Action for U.S. Appl. No. 13/608,850, dated Dec. 9, 2015, 25 pages.
Office Action dated Nov. 24, 2015 for European Application No. 14167706.2-1955, 8 pages.
Office Action dated Nov. 24, 2015 for European Application No. 14167626.2-1955, 8 pages.
Office Action dated Sep. 22, 2015 for European Application No. 14167707.0-1955, 9 pages.
Office Action for U.S. Appl. No. 13/725,660 dated Aug. 18, 2015, 90 pgs.
Colombo, A.W., et al., "Factory of the Future: A Service-Oriented System of Modular, Dynamic Reconfigurable and Collaborative Systems," Artificial Intelligence Techniques for Networked Manufacturing Enterprises Management, Springer Series in Advanced Manufacuring 2010, pp. 459-481.
Colombo, Amando Walter, et al., "Towards the Factory of the Future: A Service-Oriented Cross-layer Infrastructure," ICT Shaping the World: A Scientific View, 2009, pp. 65-81.
Office Action for U.S. Appl. No. 13/677,060, dated Oct. 20, 2015, 48 pages.
Office Action for U.S. Appl. No. 13/615,195, dated Sep. 21, 2015, 19 pages.
Office Action for U.S. Appl. No. 13/725,660, dated Oct. 26, 2015, 79 pages.
Non-Final Office Action for U.S. Appl. No. 13/677,060 dated Mar. 10, 2016, 66 pages.
Notice of Allowance for U.S. Appl. No. 13/725,660 dated Feb. 3, 2016, 47 pages.
Non-Final Office Action for U.S. Appl. No. 14/087,730 dated Mar. 11, 2016, 81 pages.
Non-Final Office Action for U.S. Appl. No. 14/087,821 dated Mar. 2, 2016, 86 pages.
Non-Final Office Action for U.S. Appl. No. 14/087,977 dated Mar. 17, 2016, 83 pages.
Recursion Software, "SCADA-Aware Mobile"", Frisco, TX, Aug. 29,2012 (accessed from<<http://www.emsenergyautomation.com/brochures/scada.pdf>> on Feb. 11, 2016)".
Ars Technica, "Windows 7 themes: how to unlock them or create your own"", Nov. 12, 2009 (accessed from http://arstechnica.com/information-technology/2009/11/unlock-hidden-windows-7-themesl on Mar. 8, 2016>>)".
Non-Final Office Action for U.S. Appl. No. 14/088,014 dated Mar. 22, 2016, 98 pages.
Microsoft, "Sharing Outlook 2010 Contact\Notes/Field?"", microsoft.com, Jun. 23, 2011 (accessed on Mar. 11, 2016 from http://answers.microsoft.com/en-us/oftice/forum/office_2010-outlook/sharing-outlook-2010-contactnotes-field/c7e74273-ff60-4da3-a3aa-ccb6cadcd25e?auth= 1)".
Notice of Allowance for U.S. Appl. No. 13/608,850 dated Apr. 12, 2016, 37 pages.
Notice of Allowance for U.S. Appl. No. 14/087,873 dated Apr. 18, 2016, 26 pages.
Chinese Office Action for Chinese Application No. 2014101961985 dated Mar. 29, 2016, 18 pages.
Non-Final Office Action for U.S. Appl. No. 14/088,011 dated May 12, 2016, 96 pages.
Office Action dated Jun. 21, 2016 for U.S. Appl. No. 13/615,195, 27 pages.
Final Office Action dated Jun. 17, 2016 for U.S. Appl. No. 13/725,543, 19 pages.
Office Action dated Jun. 17, 2016 for U.S. Appl. No. 14/087,970, 36 pages.

* cited by examiner

FIG. 11

1102 — FACILITY 1

| TIME STAMP | CONDENSER INLET PRESSURE |
|---|---|
| 2012-4-16T06:21:57.086+08:00 | 1,780.92 |
| 2012-4-16T05:21:57.086+08:00 | 1,780.80 |
| 2012-4-16T04:21:57.086+08:00 | 1,780.94 |
| 2012-4-16T03:21:57.086+08:00 | 1,781.94 |
| 2012-4-16T02:21:58.086+08:00 | 1,781.27 |

1104 — FACILITY 2

| TIME STAMP | EVAP. DISCHARGE PRESSURE |
|---|---|
| 2012-4-16T05:42:57.086+05:00 | 5,126.96 |
| 2012-4-16T05:08:36.086+05:00 | 5,126.68 |
| 2012-4-16T04:16:04.086+05:00 | 5,126.47 |
| 2012-4-16T03:52:56.086+05:00 | 5,127.51 |
| 2012-4-16T03:11:16.086+05:00 | 5,127.47 |

1106 — CHRONOLOGICAL EVENT SERIES

| TIME STAMP | DATA TAG | VALUE |
|---|---|---|
| 2012-4-16T06:21:57.086 | CONDENSER INLET PRESSURE | 1,780.92 |
| 2012-4-16T05:42:57.086 | EVAP. DISCHARGE PRESSURE | 5,126.96 |
| 2012-4-16T05:21:57.086 | CONDENSER INLET PRESSURE | 1,780.80 |
| 2012-4-16T05:08:36.086 | EVAP. DISCHARGE PRESSURE | 5,126.68 |
| 2012-4-16T04:21:58.086 | CONDENSER INLET PRESSURE | 1,780.94 |
| 2012-4-16T04:16:04.086 | EVAP. DISCHARGE PRESSURE | 5,126.47 |
| 2012-4-16T03:52:56.086 | EVAP. DISCHARGE PRESSURE | 5,127.51 |
| 2012-4-16T03:21:57.086 | CONDENSER INLET PRESSURE | 1,781.94 |
| 2012-4-16T03:11:16.086 | EVAP. DISCHARGE PRESSURE | 5,127.47 |
| 2012-4-16T02:21:58.086 | CONDENSER INLET PRESSURE | 1,781.27 |

TIME-STAMPING OF INDUSTRIAL CLOUD DATA FOR SYNCHRONIZATION

RELATED APPLICATIONS

This application claims the benefit of U.S. Provisional Patent Application Ser. No. 61/587,531, filed on Feb. 9, 2012, and entitled "INDUSTRIAL AUTOMATION CLOUD COMPUTING SYSTEMS AND METHODS." This application is also related to U.S. patent application Ser. No. 10/162, 315, filed on Jun. 4, 2002 (which issued as U.S. Pat. No. 7,151,966 on Dec. 19, 2006), and entitled "SYSTEM AND METHODOLOGY PROVIDING OPEN INTERFACE AND DISTRIBUTED PROCESSING IN AN INDUSTRIAL CONTROLLER ENVIRONMENT." The entireties of these applications are incorporated herein by reference.

TECHNICAL FIELD

The subject application relates generally to industrial automation, and, more particularly, to time-stamping of industrial data for cloud-based storage, computing, or analysis.

BACKGROUND

Industrial controllers and their associated I/O devices are central to the operation of modem automation systems. These controllers interact with field devices on the plant floor to control automated processes relating to such objectives as product manufacture, material handling, batch processing, supervisory control, and other such applications. Industrial controllers store and execute user-defined control programs to effect decision-making in connection with the controlled process. Such programs can include, but are not limited to, ladder logic, sequential function charts, function block diagrams, structured text, or other such programming structures.

Unlike general purpose computing devices, industrial automation devices often generate vast amounts of (near) real-time data. This is due in part to the large number of system variables that must be monitored and controlled substantially in real-time for a given automation system. In addition to production statistics, data relating to machine health, alarm statuses, operator feedback (e.g., manually entered reason codes associated with a downtime condition), electrical or mechanical load over time, and the like must be monitored, and in some cases recorded, on a continuous basis. This data is generated by the many industrial devices that can make up a given automation system, including the industrial controller and its associated I/O, telemetry devices for near real-time metering, motion control devices (e.g., drives for controlling the motors that make up a motion system), visualization applications, lot traceability systems (e.g., barcode tracking), etc. Moreover, since many industrial facilities operate on a 24-hour basis, their associated automation systems can generate a vast amount of potentially useful data at high rates. For an enterprise with multiple plant facilities for which data is to be collated, the amount of generated automation data increases even more.

Some industrial enterprises comprise multiple facilities residing at different locations, sometimes in different time zones. In some cases, certain operations at one facility may depend on operations carried out at another facility. For example, a sheet metal stamping press at one facility may provide a finished part required by an assembly operation at another facility. Thus, downtime events that affect product flow at the first facility can have an impact on operations at the second facility, even though that impact may not be seen until several days or weeks after the downtime event. Such correlations are not limited to the plant floor operations. Business level operations—financial analysis, marketing, sales, order management, resource management, inventory management, etc.—are also affected by events on the plant floor at any given facility. In the other direction, business-level operations have an effect on the plant-floor side operations, as when inventory levels drive the demand for manufacture of a particular component, or when manufacture of a particular product depends on when an order for a particular material is placed.

In large integrated systems, unknown inter-dependencies can exist which render trouble-shooting of problems difficult. Analyzing such correlations between geographically distributed facilities, and between plant-level and business-level operations, can be challenging, particularly when an effect of a root cause event at one facility may not be seen at another facility for a relatively long period of time. Analysis can be even more difficult if the manufacturing facilities reside in different time zones.

The above-described deficiencies of today's industrial control and business systems are merely intended to provide an overview of some of the problems of conventional systems, and are not intended to be exhaustive. Other problems with conventional systems and corresponding benefits of the various non-limiting embodiments described herein may become further apparent upon review of the following description.

SUMMARY

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

One or more embodiments of the present disclosure relate to time-stamping of industrial data for cloud-based storage and analysis. To this end, cloud-capable industrial devices can include internal clocks that are synchronized with a central time provider. Options for the latter include but are not limited to a GPS interface, an atomic clock receiver, or a centralized Internet-based cloud clock associated with a cloud based service or application running on a cloud platform. The industrial devices can then time-stamp collected or generated data and provide the time-stamped data to the cloud platform for storage and/or analysis by the cloud-based service or application. In this way, data can be collected at the cloud platform across different time zones at different times, and the collected data can be associated in a manner that facilitates generation of a larger set of information that can provide a deeper understanding of the data than would be possibly by individual analysis of disparate data sets. For example, in a globally integrated system in which a particular event at one location has downstream consequences at a different location (possibly in a different time zone), time-stamping of data can facilitate analysis of the data in the cloud platform to identify cause-and-effect relationships between the two locations.

In another aspect, a cloud-based data analysis service can aggregate time-stamped industrial data from multiple, geographically diverse sources, and leverage the time-stamp data to facilitate global analysis of selected aspects of an industrial enterprise. For example, events represented by the industrial data can be recreated in chronological order, and cloud-based analysis can be performed on the ordered data in order to deconstruct a source or root cause of a problem (e.g., a downtime event). In some embodiments, prognostic analysis can also be performed on the time-stamped data by the cloud-based services to facilitate anomaly prediction. The time-stamped data can also make possible cloud-based tracking of a product through entire manufacturing, distribution, sales, and use processes, even if the product travels between facilities. In yet another aspect, time-stamped industrial data can be married with video data to provide another dimension of analysis.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

BRIEF DESCRIPTION OF THE DRAWINGS

FIG. 11 illustrates an exemplary chronological aggregation of time-stamped data sets.

DETAILED DESCRIPTION

Figure 1:
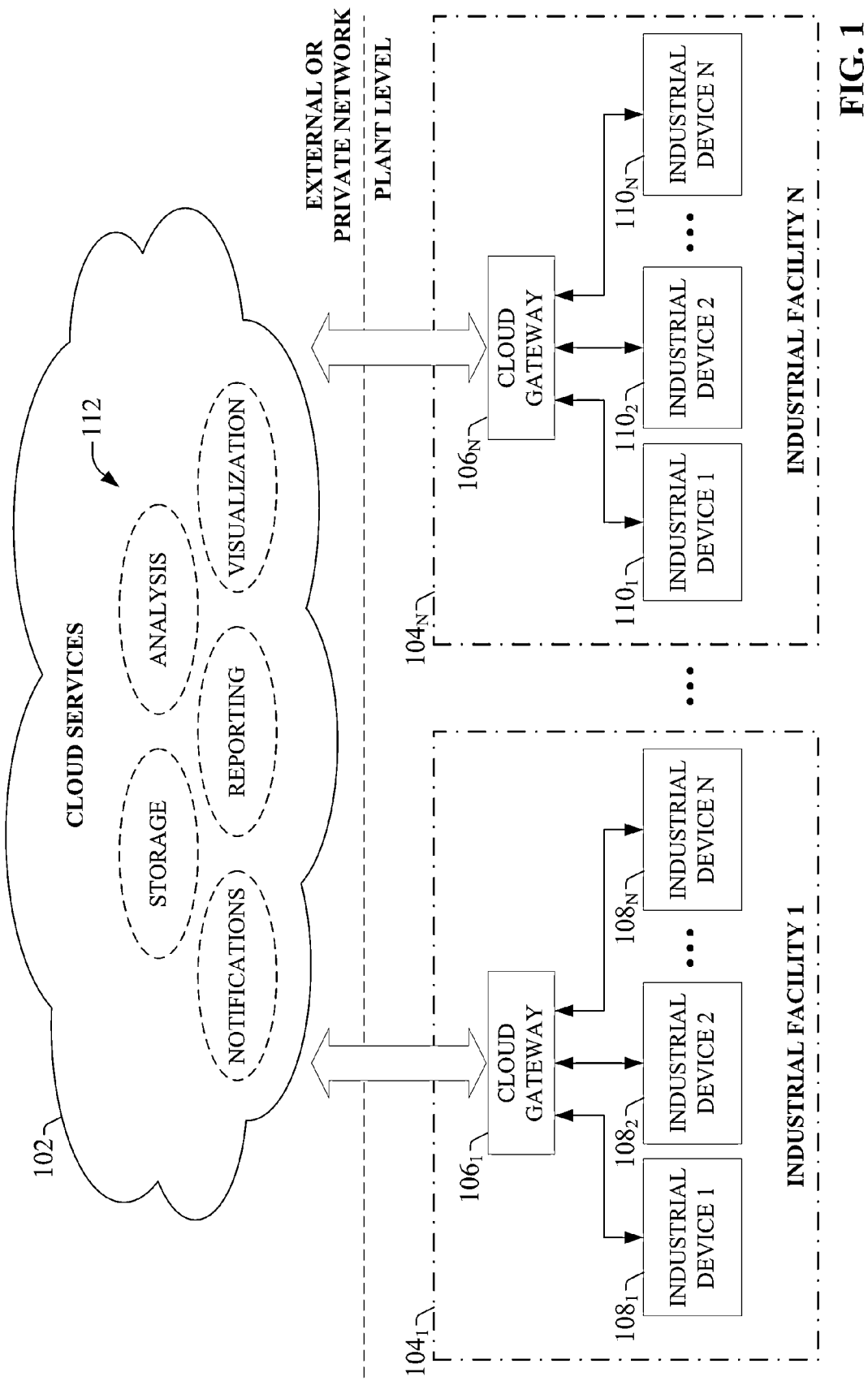
FIG. 1 is a high-level overview of an industrial enterprise that leverages cloud-based services.

The subject disclosure is now described with reference to the drawings, wherein like reference numerals are used to refer to like elements throughout. In the following description, for purposes of explanation, numerous specific details are set forth in order to provide a thorough understanding thereof. It may be evident, however, that the subject disclosure can be practiced without these specific details. In other instances, well-known structures and devices are shown in block diagram form in order to facilitate a description thereof.

As used in this application, the terms "component," "system," "platform," "layer," "controller," "terminal," "station," "node," "interface" are intended to refer to a computer-related entity or an entity related to, or that is part of, an operational apparatus with one or more specific functionalities, wherein such entities can be either hardware, a combination of hardware and software, software, or software in execution. For example, a component can be, but is not limited to being, a process running on a processor, a processor, a hard disk drive, multiple storage drives (of optical or magnetic storage medium) including affixed (e.g., screwed or bolted) or removably affixed solid-state storage drives; an object; an executable; a thread of execution; a computer-executable program, and/or a computer. By way of illustration, both an application running on a server and the server can be a component. One or more components can reside within a process and/or thread of execution, and a component can be localized on one computer and/or distributed between two or more computers. Also, components as described herein can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/output (I/O) components as well as associated processor, application, or Application Programming Interface (API) components. While the foregoing examples are directed to aspects of a component, the exemplified aspects or features also apply to a system, platform, interface, layer, controller, terminal, and the like.

As used herein, the terms "to infer" and "inference" refer generally to the process of reasoning about or inferring states of the system, environment, and/or user from a set of observations as captured via events and/or data. Inference can be employed to identify a specific context or action, or can generate a probability distribution over states, for example.

The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In addition, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the term "set" as employed herein excludes the empty set; e.g., the set with no elements therein. Thus, a "set" in the subject disclosure includes one or more elements or entities. As an illustration, a set of controllers includes one or more controllers; a set of data resources includes one or more data resources; etc. Likewise, the term "group" as utilized herein refers to a collection of one or more entities; e.g., a group of nodes refers to one or more nodes.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches also can be used.

FIG. 1 illustrates a high-level overview of an industrial enterprise that leverages cloud-based services. The enterprise comprises one or more industrial facilities 104, each having a number of industrial devices 108 and 110 in use. The industrial devices 108 and 110 can make up one or more automation systems operating within the respective facilities 104. Exemplary automation systems can include, but are not limited to, batch control systems (e.g., mixing systems), continuous control systems (e.g., PID control systems), or discrete control systems. Industrial devices 108 and 110 can include such devices as industrial controllers (e.g., programmable logic controllers or other types of programmable automation controllers); field devices such as sensors and meters; motor drives; human-machine interfaces (HMIs); industrial robots, barcode markers and readers; vision system devices (e.g., vision cameras); smart welders; or other such industrial devices.

Exemplary automation systems can include one or more industrial controllers that facilitate monitoring and control of their respective processes. The controllers exchange data with the field devices using native hardwired I/O or via a plant network such as Ethernet/IP, Data Highway Plus, ControlNet, Devicenet, or the like. A given controller typically receives any combination of digital or analog signals from the field devices indicating a current state of the devices and their associated processes (e.g., temperature, position, part presence or absence, fluid level, etc.), and executes a user-defined control program that performs automated decision-making for the controlled processes based on the received signals. The controller then outputs appropriate digital and/or analog control signaling to the field devices in accordance with the decisions made by the control program. These outputs can include device actuation signals, temperature or position control signals, operational commands to a machining or material handling robot, mixer control signals, motion control signals, and the like. The control program can comprise any suitable type of code used to process input signals read into the controller and to control output signals generated by the controller, including but not limited to ladder logic, sequential function charts, function block diagrams, structured text, or other such platforms.

Although the exemplary overview illustrated in FIG. 1 depicts the industrial devices 108 and 110 as residing in stationary industrial facilities 104, the industrial devices may also be part of a mobile control application, such as a system contained in a truck or other service vehicle.

According to one or more embodiments of this disclosure, industrial devices 108 and 110 can be coupled to a cloud platform to leverage cloud-based applications. That is, the industrial device 108 and 110 can be configured to discover and interact with cloud-based computing services 112 hosted by cloud platform 102. Cloud platform 102 can be any infrastructure that allows shared computing services 112 to be accessed and utilized by cloud-capable devices. Cloud platform 102 can be a public cloud accessible via the Internet by devices having Internet connectivity and appropriate authorizations to utilize the services. Alternatively, cloud 102 can be a private cloud operated internally by the enterprise. An exemplary private cloud can comprise a set of servers hosting the cloud services 112 and residing on a corporate network protected by a firewall.

Cloud services 112 can include, but are not limited to, data storage, data analysis, control applications (e.g., applications that can generate and deliver control instructions to industrial devices 108 and 110 based on analysis of near real-time system data or other factors), visualization applications such as cloud-based HMIs, reporting applications, Enterprise Resource Planning (ERP) applications, notification services, or other such applications. If cloud platform 102 is a web-based cloud, industrial devices 108 and 110 at the respective industrial facilities 104 may interact with cloud services 112 via the Internet. In an exemplary configuration, industrial devices 108 and 110 may access the cloud services 112 through separate cloud gateways 106 at the respective industrial facilities 104, where the industrial devices 108 and 110 connect to the cloud gateways 106 through a physical or wireless local area network or radio link. In another exemplary configuration, the industrial devices may access the cloud platform directly using an integrated cloud interface.

Providing industrial devices with cloud capability can offer a number of advantages particular to industrial automation. For one, cloud-based storage offered by the cloud platform can be easily scaled to accommodate the large quantities of data generated daily by an industrial enterprise. Moreover, multiple industrial facilities at different geographical locations can migrate their respective automation data to the cloud for aggregation, collation, collective analysis, and enterprise-level reporting without the need to establish a private network between the facilities. Industrial devices 108 and 110 having smart configuration capability can be configured to automatically detect and communicate with the cloud platform 102 upon installation at any facility, simplifying integration with existing cloud-based data storage, analysis, or reporting applications used by the enterprise. In another exemplary application, cloud-based diagnostic applications can monitor the health of respective automation systems or their associated industrial devices across an entire plant, or across multiple industrial facilities that make up an enterprise. Cloud-based lot control applications can be used to track a unit of product through its stages of production and collect production data for each unit as it passes through each stage (e.g., barcode identifier, production statistics for each stage of production, quality test data, abnormal flags, etc.). These industrial cloud-computing applications are only intended to be exemplary, and the systems and methods described herein are not limited to these particular applications. The cloud platform 102 can allow builders of industrial applications to provide scalable solutions as a service, removing the burden of maintenance, upgrading, and backup of the underlying infrastructure and framework.

Figure 2:
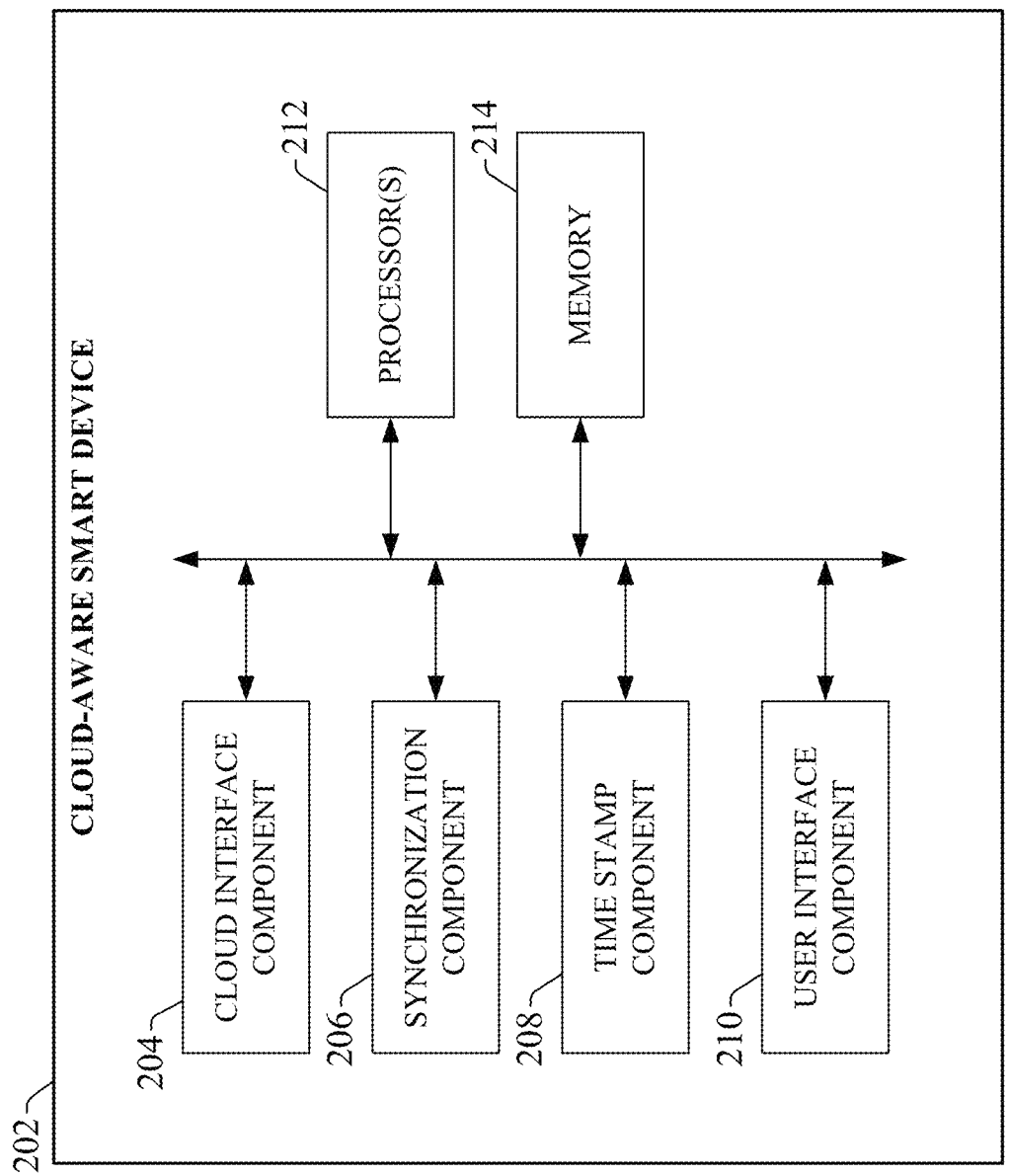
FIG. 2 is a block diagram of an exemplary cloud-aware smart device that time-stamps industrial data.

To facilitate collective data analysis required by one or more of the cloud-based processes described above, one or more embodiments of the present application can time-stamp industrial data at an industrial device prior to delivering the data to the cloud platform. FIG. 2 is a block diagram of an exemplary cloud-aware smart device that can associate respective items of industrial data with time-stamps that can be leveraged by a cloud-based service or application in connection with one or more of the cloud-based analyses described above. Aspects of the systems, apparatuses, or processes explained in this disclosure can constitute machine-executable components embodied within machine(s), e.g., embodied in one or more computer-readable mediums (or media) associated with one or more machines. Such components, when executed by one or more machines, e.g., computer(s), computing device(s), automation device(s), virtual machine(s), etc., can cause the machine(s) to perform the operations described.

Cloud-aware smart device 202 can be virtually any type of device used in conjunction with monitor and/or control of an industrial automation system, including but not limited to an industrial controller (e.g., programmable logic controllers or other types of programmable automation controllers); a field device such as a sensor and meter; a motor drive; a human-machine interface (HMI) or other type of operator interface terminal; a data historian that collects and stores industrial data for medium- or long-term storage; an industrial robot, a barcode marker or reader; a vision system device (e.g., vision camera); a smart welder; or other such industrial devices. In one or more embodiments, such industrial devices can automatically communicate with a cloud platform and provide information about the device's context, role, location, etc. to facilitate automatic integration with one or more cloud-based applications or services, as well as integration with other components of the industrial system. In addition to plant floor devices, cloud-aware smart device 202 can also be a device associated with a higher level system, such as a supervisory control system, batch system, business intelligence systems, enterprise resource planning (ERP) system, a site-level historian used for archival data storage, and the like.

Cloud-aware smart device 202 can include a cloud interface component 204, a synchronization component 206, a time stamp component 208, a user interface component 210, one or more processors 212, and memory 214. In various embodiments, one or more of the cloud interface component 204, synchronization component 206, time stamp component 208, user interface component 210, one or more processors 212, and memory 214 can be electrically and/or communicatively coupled to one another to perform one or more of the functions of the cloud-aware smart device 202. In some embodiments, components 204, 206, 208, and 210 can comprise software instructions stored on memory 214 and executed by processor(s) 212. Cloud-aware smart device 202 may also interact with other hardware and/or software components not depicted in FIG. 2. For example, processor(s) 212 may interact with one or more external user interface devices, such as a keyboard, a mouse, a display monitor, a touchscreen, or other such interface devices.

Cloud interface component 204 can be configured to couple cloud-aware smart device 202 to a web-based or private cloud platform and exchange data with the cloud platform. Synchronization component 206 can be configured to synchronize the device's internal clock with a reference time according to any suitable synchronization protocol. For example, synchronization component 206 may receive a synchronization signal from an atomic clock receiver, a GPS receiver, or a network-based time service such as an NTP (Network Time Protocol; RFC-1305) or IEEE 1588 Precision Time Protocol (PTP) server. Synchronization component 206 may also receive the synchronization signal from a dedicated service or application residing on the cloud platform that synchronizes the device's internal clock with a clock associated with the cloud platform. Time stamp component 208 can be configured to associate respective data items with a time stamp reflecting a time at which the data item was measured or generated by cloud-aware smart device 202. User interface component 210 can be configured to receive user input and to render output to the user in any suitable format (e.g., visual, audio, tactile, etc.). User input can be, for example, time zone information defining a time zone in which cloud-aware smart device resides, display preference information specifying a preferred local display format for time stamp data, or other relevant user input. Output data can comprise, for example, visualization of selected data values stored on cloud-aware smart device 202, together with associated time stamp data rendered in a preferred display format.

The one or more processors 212 can perform one or more of the functions described herein with reference to the systems and/or methods disclosed. Memory 214 can be a computer-readable storage medium storing computer-executable instructions and/or information for performing the functions described herein with reference to the systems and/or methods disclosed.

Figure 3:
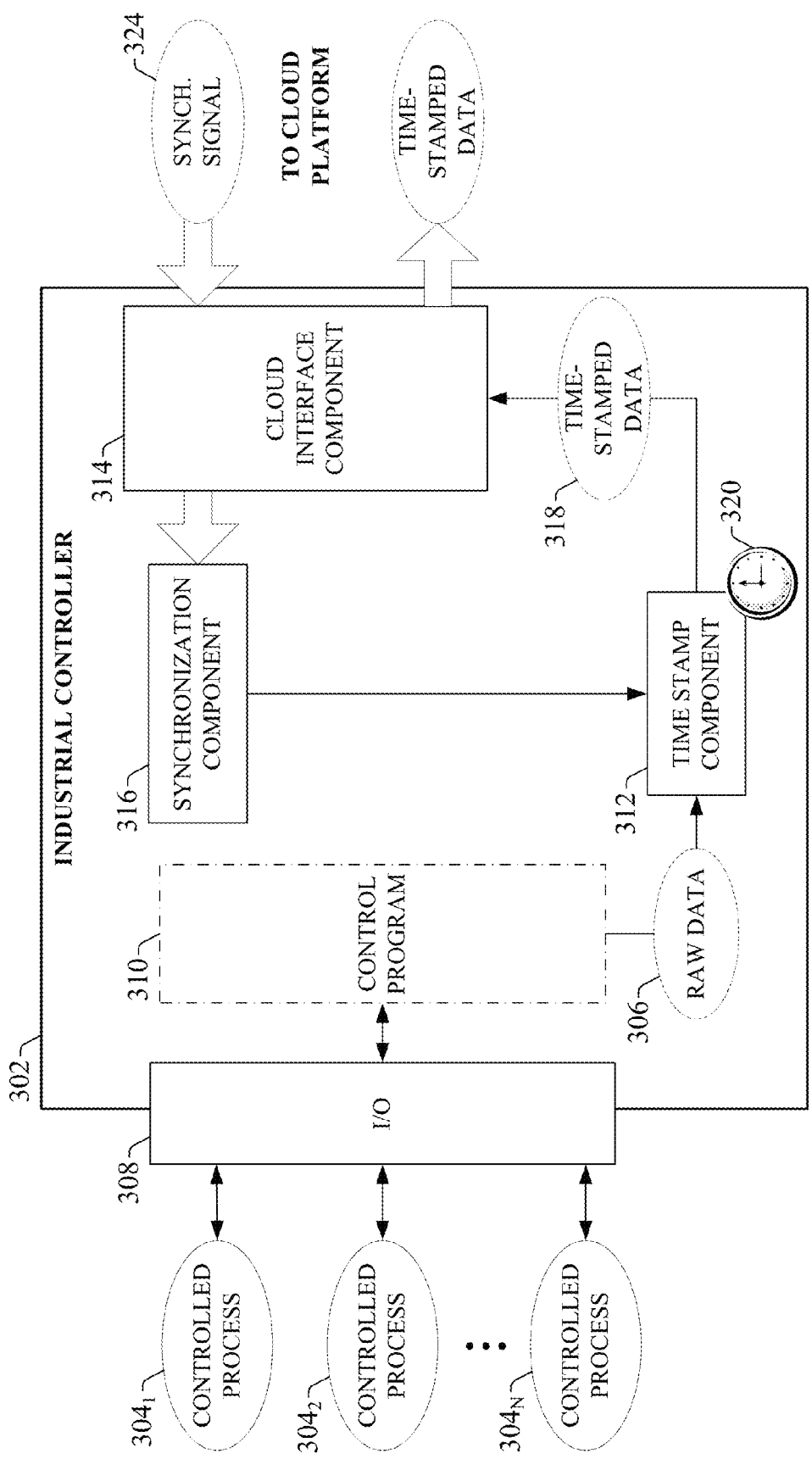
FIG. 3 is a block diagram of an exemplary cloud-aware smart device capable of providing synchronized, time-stamped industrial data to a cloud platform.

FIG. 3 illustrates an exemplary cloud-aware smart device capable of providing synchronized, time-stamped industrial data to a cloud platform. Although FIG. 3 illustrates certain aspects of the present disclosure in connection with an industrial controller, it is to be appreciated that the time stamping functions described herein can be implemented on any suitable industrial device that generates or collects data in connection with monitoring or controlling an industrial process, including but not limited to a variable frequency drive (VFD), an operator interface terminal (e.g., a human-machine interface), a telemetry device, a sensor, a vision camera, a barcode marker or reader, a data historian, or other industrial types of industrial devices. In the present example, industrial controller 302 can be, for example, a programmable logic controller (PLC) or other type of programmable automation controllers (PAC) executing control program 310 to facilitate monitoring and control of one or more controlled industrial processes $304_1$-$304_N$. Control program 310 can be any suitable code used to process input signals read into industrial controller 302 and to control output signals from the controller 302, including but not limited to ladder logic, sequential function charts, function block diagrams, or structured text. Data read into or generated by controller 302 can be stored in memory addresses within controller memory (e.g., native memory or removable storage media).

Industrial controller 302 can exchange data with the controlled industrial processes $304_1$-$304_N$ through I/O 308, which can comprise one or more local or remote input and/or output modules that communicate with one or more field devices to effect control of the controlled industrial processes $304_1$-$304_N$. The input and/or output modules can include digital modules that send and receive discrete voltage signals to and from the field devices, or analog modules that transmit and receive analog voltage or current signals to and from the devices. The input and/or output modules can communicate with the controller processor over a backplane or network such that the digital and analog signals are read into and controlled by the control program 310. Industrial controller 302 can also communicate with field devices over a network using, for example, a communication module or an integrated networking port. Exemplary networks over which controller 302 can communicate with field devices can include the Internet, Intranets, Ethernet, Ethernet/IP, DeviceNet, ControlNet, Data Highway and Data Highway Plus (DH/DH+), Remote I/O, Fieldbus, Modbus, Profibus, wireless networks, serial protocols, and the like. It is to be appreciated that industrial controller 302 is not limited to the above specifications, and can be any suitable controller used to control an industrial process.

During operation, industrial controller 302 generates or collects (near) real-time data relating to controlled industrial processes $304_1$-$304_N$, such as part counts, temperatures, pressures, motor speeds or loads, vibration data, weights, quality test results, alarms, machine states, operator feedback, or other such information. Some of this data is read by the industrial controller 302 directly from field devices (e.g., telemetry devices) associated with the processes themselves, while other data can be generated by control program 310 based on measured process values (e.g., alarms, derived or calculated values, etc.). The data collected or generated by industrial controller data—raw data 306—can be stored in non-volatile memory associated with the industrial controller 302, or may only exist on a transient basis (e.g., near real-time machine state data that only exists within the controller 302 as long as the machine remains in the indicated state, but is not stored in non-volatile memory). As used in this disclosure, the term "raw" data is intended to refer to any industrial data that has not been enhanced with time-stamp information. This can include, but is not limited to, data that has been collected, generated, and/or processed by an industrial device (e.g., a programmable logic controller, automation controller, human-machine interface, network infrastructure device, enterprise resource planning system, etc.), data stored on an industrial device or data historian, data generated by field devices (e.g., sensors, meters, etc.), or other such data.

Industrial controller 302 is configured to be cloud-capable, allowing it to connect to a web-based or private cloud platform and utilize cloud-based services hosted thereon (e.g., data storage, analysis, processing, etc.). To this end, industrial controller 302 can include a cloud interface component 314 that couples the industrial controller 302 to the cloud. Cloud interface component 314 can be configured to access the cloud through any suitable hardwired or wireless connection to the Internet (e.g., through a network connection to an Internet server, or through cloud gateway 106 of FIG. 1). In one or more embodiments, cloud interface component 314 can execute an auto-configuration routine that facilitates connection of industrial controller 302 to the cloud. In accordance with this auto-configuration routine, the cloud interface component 314 can provide information to the cloud services about the industrial controller 302 and its context within the overall enterprise or plant hierarchy. For example, when the industrial controller 302 initially interfaces with the cloud platform during deployment, the cloud interface component 314 can provide such information as a device identifier for the controller; a geographic location of the controller; a location of the controller relative to the greater automation system, plant, or hierarchy to which the controller belongs; indications of other devices or systems in proximity to the controller (e.g., devices communicatively coupled to the controller); diagnostic information for the controller; or other such information that can be used by the cloud services to facilitate integration of the controller within the plant-wide or enterprise-wide system. Once configured, the cloud interface component 314 can push controller data to the cloud and receive data from the cloud services.

To facilitate time-based analysis of the industrial data on the cloud platform, industrial controller 302 can include a time stamp component 312 configured to associate time stamps to the raw data 306 prior to pushing the data to the cloud platform. For raw data 306 representing measured data values or statuses received at industrial controller 302 from monitored field devices, such as metered values or sensor states received via I/O 308, the time stamp can correspond to a time at which the metered value was read. For raw data 306 originating within industrial controller 302, such as alarm notifications or data values calculated within industrial controller 302, the time stamp can represent the time that the value or alarm was generated. In either scenario, when new raw data 306 is received or generated, time stamp component 312 can apply a time stamp to the raw data based on the controller's internal clock 320 to yield time-stamped data 318. The time stamp may also optionally include a UTC (Coordinated Universal Time) offset or a time zone indicator so that the time-zone can be converted to the local time zone of the device that generated the data if necessary. Cloud interface component 314 can then send the time-stamped data 318 and associated UTC offset to the cloud platform (e.g., over a generic Internet layer) for cloud-based storage and/or processing.

In some configurations, the cloud platform may receive data from multiple industrial devices at disparate locations for collective analysis. To facilitate accurate collective analysis of such disparate data sets, the time stamps for all data received by the cloud platform should conform to a common time standard. For example, in order to accurately determine when an event at a first plant facility occurred relative to an event at a second plant facility, the internal device clocks used to time-stamp the data sets from the respective facilities should be synchronized. To this end, industrial controller 302 can also include a synchronization component 316 configured to maintain synchronization between the device's internal clock 320 and a defined reference time. In one or more embodiments, synchronization component 316 can synchronize the internal clock 320 with a master clock maintained on the cloud platform. In such embodiments, synchronization component 316 can periodically or continuously adjust the device's internal clock 320 in accordance with a centralized clock (e.g., via an atomic clock or GPS signal receiver, or a network based protocol such as NTP (Network Time Protocol, RFC-1305, etc.) or IEEE 1588 Precision Time Protocol (PTP) via a synchronization signal 324. Based on synchronization signal 324, synchronization component 316 can adjust internal clock 320 to converge with the cloud's clock.

Figure 4:
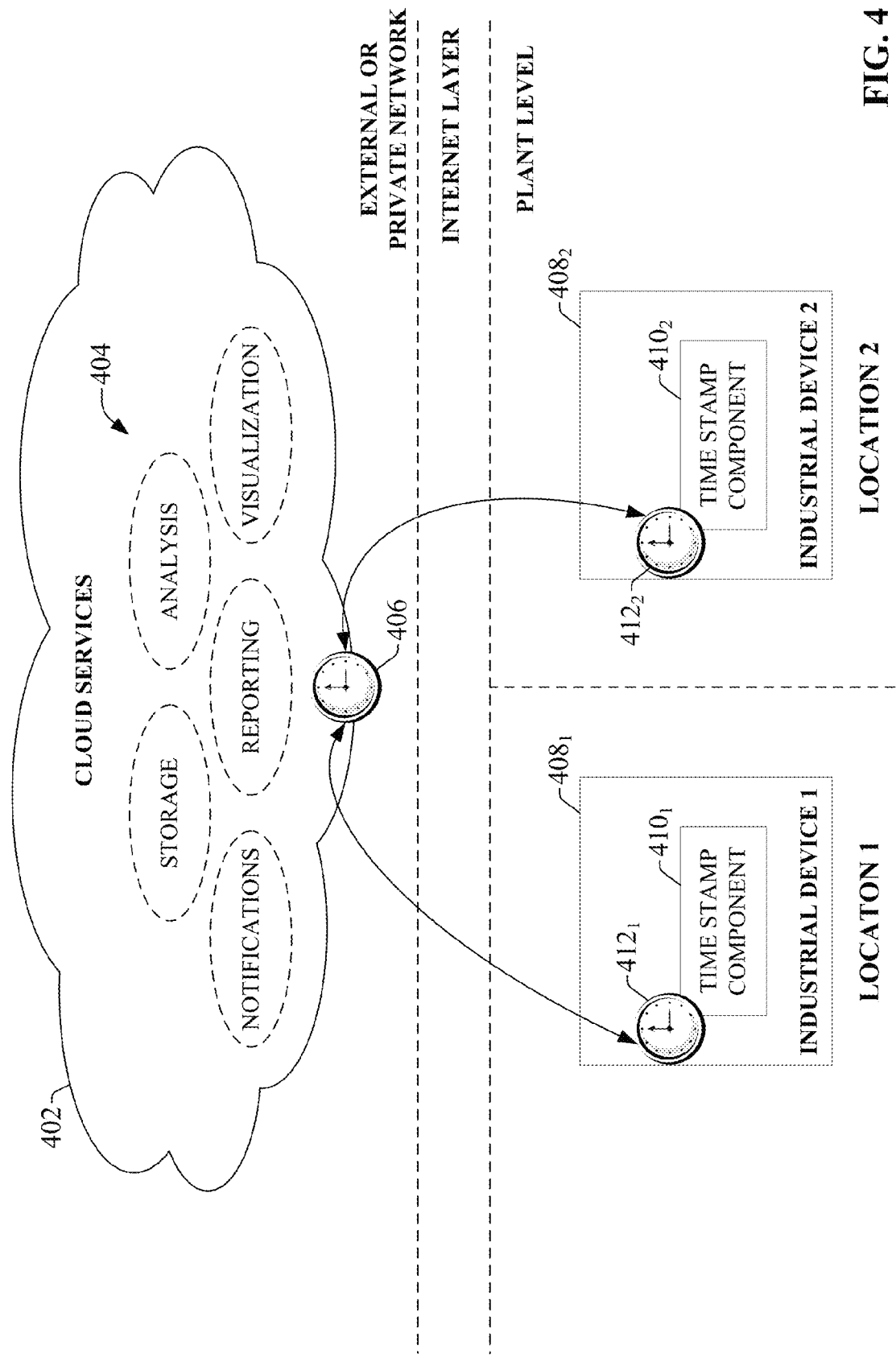
FIG. 4 is a high-level overview depicting synchronization of a device clock with a cloud clock.

Turning briefly to FIG. 4, a high-level overview depicting synchronization of a device clock with a cloud clock is illustrated. As described in previous examples, industrial devices $408_1$ and $408_2$ are configured to exchange data with a cloud platform 402 (e.g., over an Internet layer) to make use of cloud services 404 residing on the cloud platform 402. Industrial devices $408_1$ and $408_2$ can reside at different locations (Location 1 and Location 2). For example, industrial devices $408_1$ and $408_2$ may be located at different plant facilities or at different areas within the same plant facility. In some cases, industrial devices $408_1$ and $408_2$ may be located indifferent time zones. In order that data received from industrial devices $408_1$ and $408_2$ are time stamped according to a common time reference, internal device clocks $412_1$ and $412_2$ are synchronized to a cloud clock 406 maintained by the cloud platform. Time stamp components $410_1$ and $410_2$ associated with industrial devices $408_1$ and $408_2$ can then apply time stamps (plus optional UTC offsets and/or time zone indicators) to their respective data based on the times provided by synchronized device clocks $412_1$ and $412_2$. In this way, data events at each location will be accurately time stamped using a common clock standard that accurately reflects when an event at one location occurred relative to an event at the other location. Moreover, data items from both locations can be aggregated at cloud platform 402 and arranged chronologically based on the synchronized time stamps to yield an event sequence that includes data events from both locations, as will be described in more detail below. Although internal device clocks $412_1$ and $412_2$ have been synchronized with cloud clock 406, time stamps may still be viewed locally at the industrial devices $408_1$ and $408_2$ according to their respective local time zones.

Returning now to FIG. 3, synchronization component 316, in conjunction with the cloud platform services, can employ any suitable technique for maintaining synchronization between industrial controller 302 and the cloud's clock. For example, an IEEE 1588 Precision Time Protocol (PTP) can be used, wherein the cloud's clock is designated as a master clock, and synchronization component 316 can adjust internal clock 320 to converge with the cloud's clock in accordance with synchronization signal 324. This technique is only intended to be exemplary, and it is to be appreciated that any suitable technique can be used to maintain synchronization between industrial controller 302 and the cloud platform. Moreover, reference times other than a cloud clock may be used as the master clock for maintaining synchronization between devices. For example, in some embodiments, an industrial device coupled to the cloud platform may be designated to act as the master for other industrial devices coupled to the cloud platform. The other industrial devices may access the current time maintained on the master industrial device via the cloud platform and adjust their respective local clocks to align the local clocks with the master clock on the master industrial device.

Figure 5:
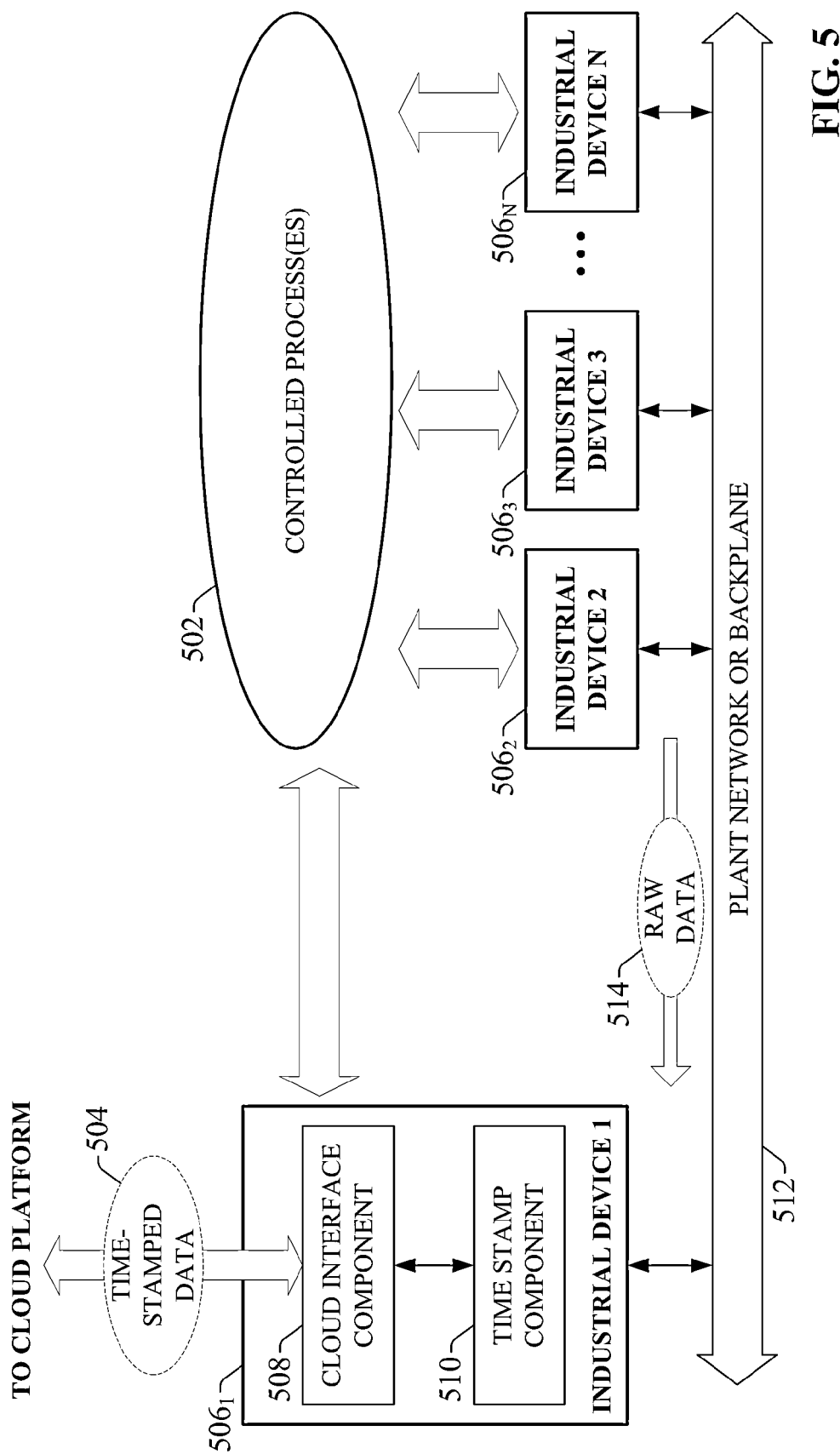
FIG. 5 illustrates a configuration in which an industrial device acts as a cloud proxy for other industrial devices comprising an automation system.

Although cloud interface component 314 was described above as connecting the cloud-aware smart device directly to the cloud platform, some configurations may utilize a cloud proxy device that collects industrial data from multiple devices, time-stamps the data, and sends the time-stamped data to the cloud platform. Such a cloud proxy can be a dedicated data collection device, such as a server that shares a network with the industrial devices. Alternatively, the cloud proxy can be a peer industrial device that collects and time-stamps data from other industrial devices. FIG. 5 depicts a configuration in which an industrial device acts as a cloud proxy for other industrial devices comprising an automation system. An automation system comprises a plurality of industrial devices $506_1$-$506_N$ which collectively monitor and/or control one or more controlled processes 502. The industrial devices $506_1$-$506_N$ respectively generate and/or collect process data relating to control of the controlled process(es) 502. For industrial controllers such as PLCs or other automation controllers, this can include collecting data from telemetry devices connected to the controller's I/O, generating data internally based on measured process values, etc.

In the configuration depicted in FIG. 5, industrial device $506_1$ acts as a proxy for industrial devices $506_2$-$506_N$, whereby raw data 514 from devices $506_2$-$506_N$ is sent to the cloud via proxy industrial device $506_1$. Industrial devices $506_2$-$506_N$ can deliver their raw data 514 to proxy industrial device $506_1$ over plant network or backplane 512 (e.g., a Common Industrial Protocol (CIP) network or other suitable network protocol). Using such a configuration, it is only necessary to interface one industrial device to the cloud platform (via cloud interface component 508). Accordingly, proxy industrial device $506_1$ can include a time stamp component 510 for applying time stamps to the collective raw data 514 collected from industrial devices $506_2$-$506_N$, as well as its own control data. The time-stamped data can then be pushed to the cloud platform as time-stamped data 504 via cloud interface component 508.

Since data is being gathered from multiple industrial devices according to this configuration, there is a possibility that redundant data may be provided to industrial device $506_1$ from more than one source. Accordingly, industrial device $506_1$ may be configured to filter such redundant data (e.g., using a filter component) prior to delivering the refined data to the cloud-based application. A summarization component (not shown) may also be configured to summarize the gathered and time-stamped data according to defined summarization criteria prior to delivery to the cloud.

Figure 6:
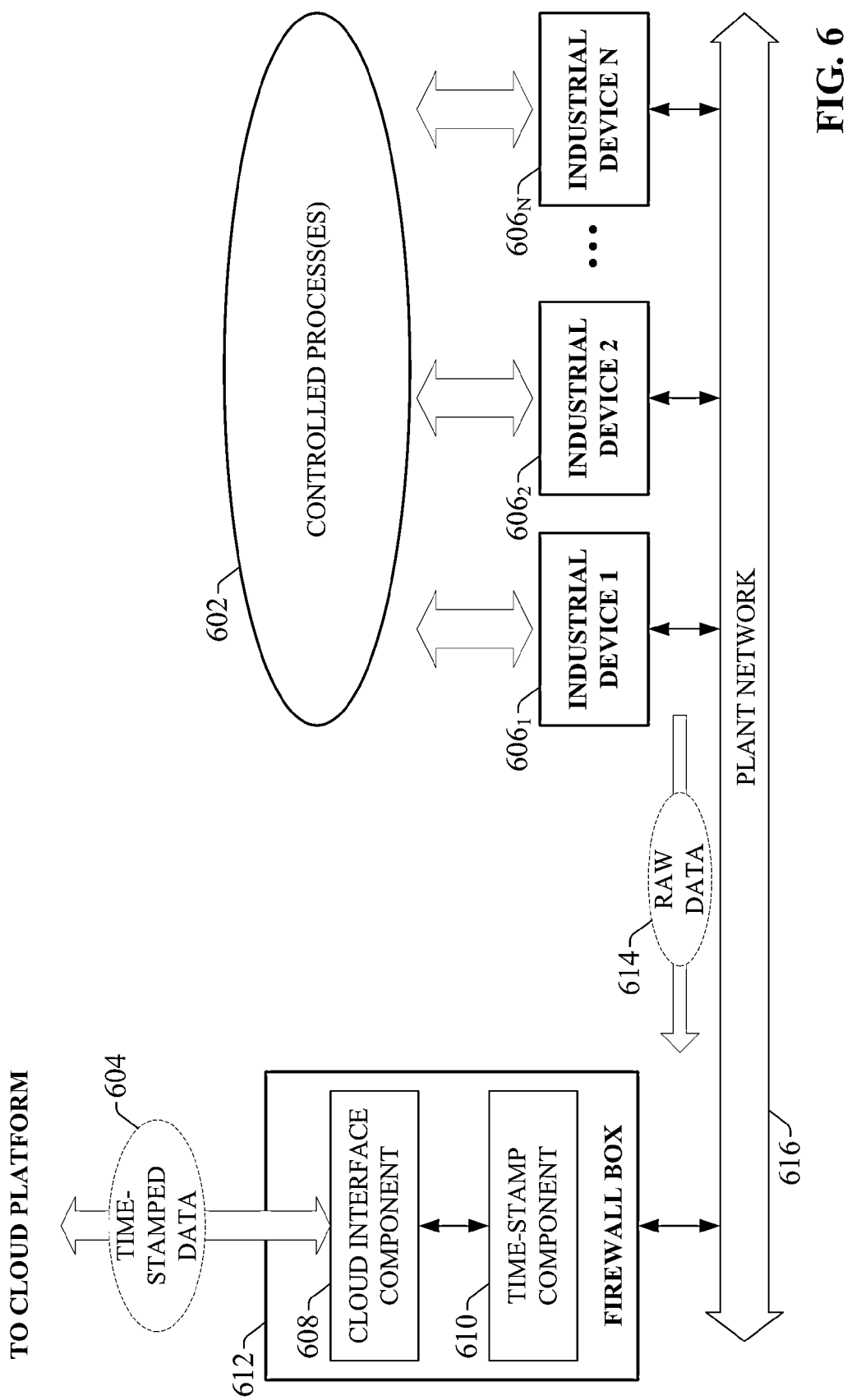
FIG. 6 illustrates a configuration in which a firewall box serves as a cloud proxy for a set of industrial devices.

While the proxy device illustrated in FIG. 5 is depicted as an industrial device that itself performs monitoring and/or control of a portion of controlled process(es) 502, other types of devices can also be configured to serve as a cloud proxies for multiple industrial devices according to one or more embodiments of this disclosure. For example, FIG. 6 illustrates an embodiment in which a firewall box 612 serves as a cloud proxy for a set of industrial devices $606_1$-$606_N$. Firewall box 612 can act as a network infrastructure device that allows plant network 616 to access an outside network such as the Internet, while also providing firewall protection that prevents unauthorized access to the plant network 161 from the Internet. In addition to these firewall functions, the firewall box 612 can include a cloud interface component 608 that interfaces the firewall box 612 with one or more cloud-based services. In a similar manner to proxy industrial device $506_1$ of FIG. 5, the firewall box 612 can collect raw industrial data 614 from industrial devices $606_1$-$606_N$, which monitor and control respective portions of controlled process(es) 602. Firewall box 612 can also include a time-stamp component 610, which applies appropriate time-stamps to the gathered raw data 614 prior to pushing the data to the cloud-based application as time-stamped data 604. Firewall box 612 can allow industrial devices $606_1$-$606_N$ to interact with the cloud platform without directly exposing the industrial devices to the Internet.

In one or more embodiments, cloud interface component 608 can also receive data from the cloud-based application, and route this data to one or more of the industrial devices $606_1$-$606_N$. For example, the cloud-based service may be an enterprise resource management (ERP) system that analyzes production data in view of one or more defined business goals, and generates production schedule information based on the analysis. Accordingly, firewall box 612 can receive the required production data from industrial devices $606_1$-$606_N$ as raw data 614, apply time stamps to the data using time-stamp component 610, and provide the production data to the cloud-based ERP system as time-stamped data 604. In response, the cloud-based ERP system can analyze the time-stamped production data and generate updated production schedule information designed to ensure that one or more defined business goals are met (e.g., fulfill a given customer order, maintain total plant energy usage below a defined peak demand, etc.). The cloud-based ERP system can provide this scheduling information to the firewall box 612 (via cloud interface component 608), which can then route the scheduling information to the appropriate industrial devices $606_1$-$606_N$. The foregoing cloud-based ERP system example can also be performed through proxy industrial device $506_1$, or through a dedicated cloud proxy device.

Figure 7:
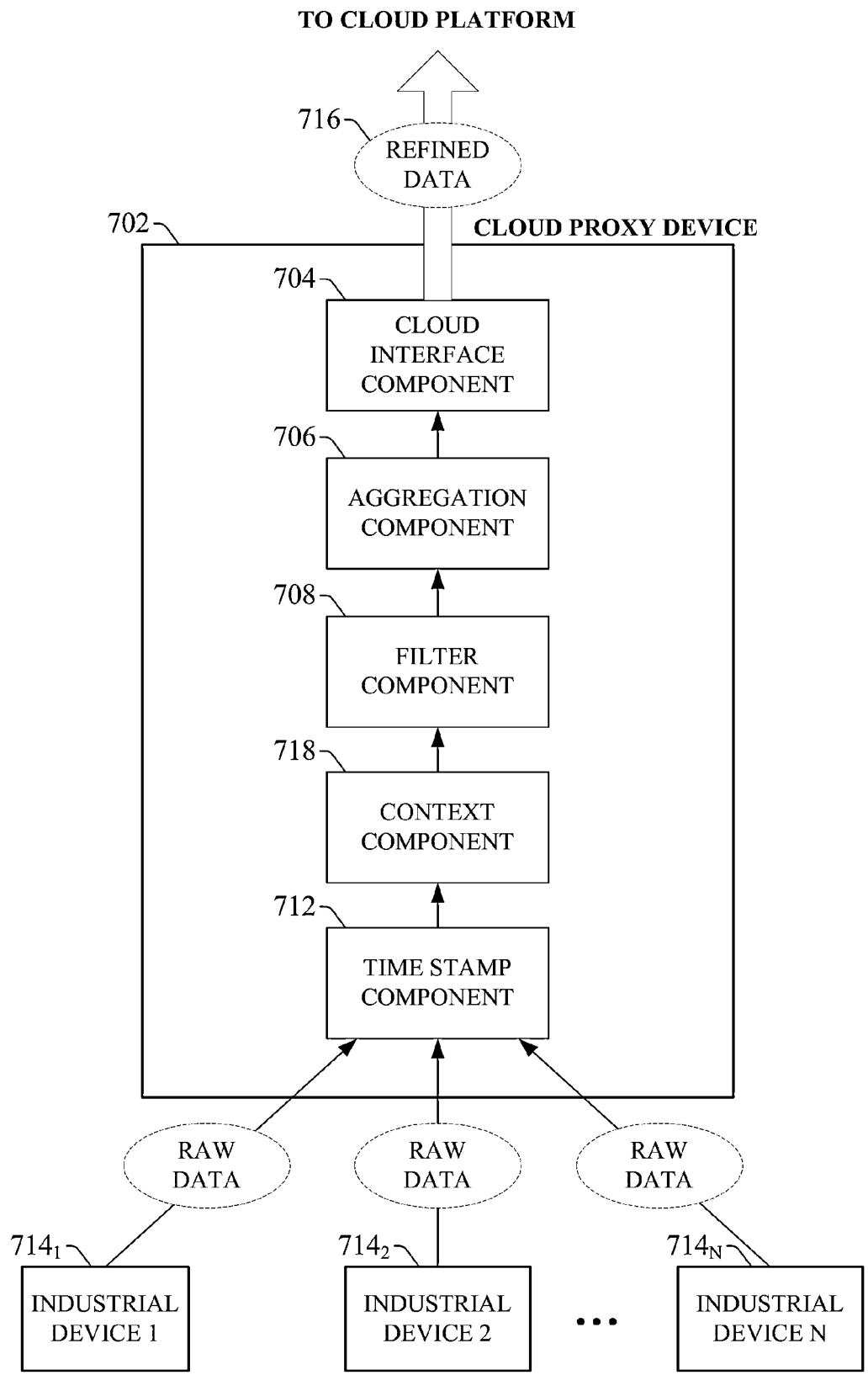
FIG. 7 illustrates an exemplary cloud proxy device capable of time-stamping, contextualizing, filtering, and aggregating industrial data for delivery to a cloud platform.

FIG. 7 illustrates another view of a cloud proxy device according to one or more exemplary embodiments. Cloud proxy device 702 can be any suitable device (such as proxy industrial device $506_1$ of FIG. 5, firewall box 612 of FIG. 6, or a dedicated cloud proxy) that gathers raw production data from one or more industrial devices $714_1$-$714_N$ and delivers this data to a cloud-based application or service. Cloud proxy device 702 includes a time stamp component 712 configured to time-stamp the raw production data, as described in previous examples. In the present example, cloud proxy device 702 is configured to further refine the time-stamped data by appending the data with contextual metadata, apply filtering to remove data not needed by the cloud-based application, and aggregate the remaining data according to defined aggregation criteria. To this end, cloud proxy device 702 includes a context component 718, a filter component 708, and an aggregation component 706 to transform the time-stamped data to refined data 716.

Figure 8:
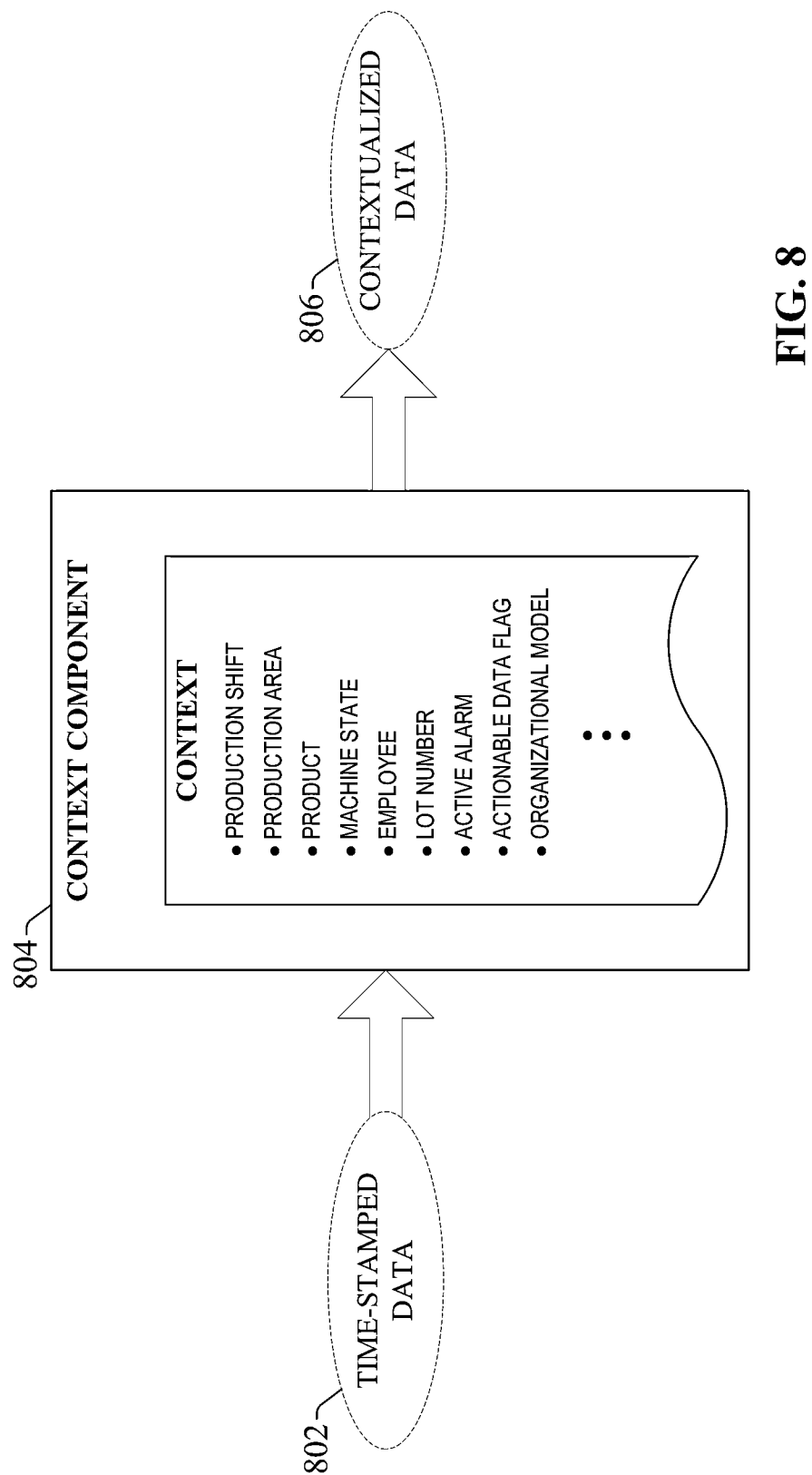
FIG. 8 illustrates an exemplary context component for adding contextual information to industrial data.

Context component 718 can append contextual information or metadata to the time-stamped data. The contextual information provides context for the industrial data, which can be leveraged by subsequent transformation steps or used by the cloud-based application in connection with cloud-side analysis. Turning briefly to FIG. 8, an exemplary context component 804 for adding contextual information to industrial data is illustrated. Context component 804 receives time-stamped production data 802 and enhances the time-stamped production data 802 with one or more pieces of context data to yield contextualized data 806. Although the present example depicts the industrial data as being time-stamped prior to associating contextual information to the data, one or more embodiments may contextualize the data prior to time-stamping the data (that is, time stamp component 712 and context component 718 may be exchanged in FIG. 7). As an exemplary item of contextual information, context component 804 can associate production shift information to the data indicating a production shift during which the data was generated. Context component 804 may determine the production shift based on the time stamp applied to the data. The applied contextual information may also include a production area that yielded the data, a particular product that was being produced when the data was generated, and/or a state of a machine (e.g., auto, semi-auto, abnormal, etc.) at the time the data was generated. Other examples of contextual information include an employee on shift at the time the data was generated, a lot number with which the data is associated, or an alarm that was active at the time the data was generated. Context component 804 can also apply an actionable data tag to the industrial data if it is determined that the data requires action to be taken by plant personnel or by the cloud-based application.

Figure 9:
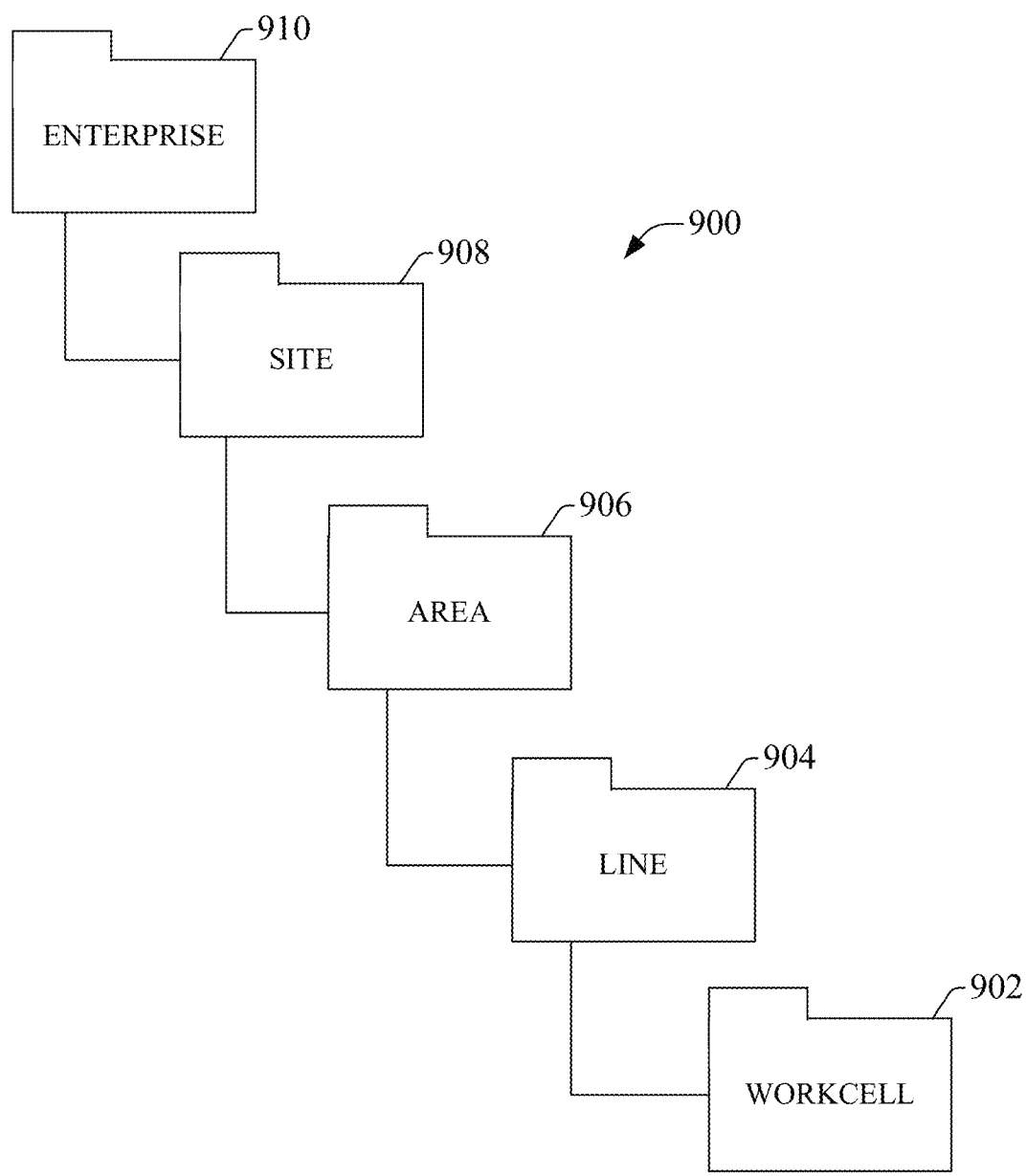
FIG. 9 illustrates an exemplary hierarchy that can be used as a basis for an organizational model.

Context component 804 an also apply contextual information to the time-stamped production data 802 that reflects the data's location within a hierarchical organizational model. Such an organization model can represent an industrial enterprise in terms of multiple hierarchical levels. An exemplary non-limiting hierarchy 900 that can be used as a basis for such an organizational model is illustrated in FIG. 9. In an exemplary organizational model, the hierarchical levels can include—from lowest to highest—a workcell level 902, a line level 904, an area level 906, a site level 908, and an enterprise level 910. Devices that are components of a given automation system can be described and identified in terms of these hierarchical levels, allowing a common terminology to be used across the entire enterprise to identify devices, machines, and data within the enterprise. In some embodiments, the organizational model can be known to the context component 804, which can associate the time-stamped production data 802 with a hierarchical identification tag that indicates the data's origin within the organizational hierarchy (e.g., Company:Marysville:DieCastArea:#1Headline:LeakTestCell).

Returning to FIG. 7, after the context component 718 has added contextual information to the raw data, filter component 708 can determine which of the contextualized data is to be pushed to the cloud, and discard data that is not required by the cloud-based service. Filter component 708 can filter the time-stamped and contextualized data according to any specified filtering criterion. In some embodiments, filtering criteria can be defined in a filtering profile associated with cloud proxy device 702. Exemplary filtering criteria can include instructions to discard certain types of data if the data falls outside a defined range. For example, the filtering criteria can specify that weight data collected from a testing device of a particular workcell is to be discarded if the data exceeds a maximum weight value indicative of a faulty reading. In such scenarios, the data to which this filter criterion is to be applied can be identified based on contextual information applied to the data by the context component 718. Filter component 708 can also be configured to identify redundant data collected from two or more of the industrial devices $714_1$-$714_N$, and discard redundant instances of the same data. Again, filter component 708 can leverage contextual information applied by context component 718 to identify instances of redundant data.

Filter component 708 can also filter the time-stamped and contextualized data based on the time-stamps applied by time stamp component 712. For example, the filtering profile may specify that data from selected data tags are only required at intervals of five minutes or greater (e.g., if the cloud-based application does not require the selected data values at highly granular time intervals). Accordingly, filter component 708 can examine the time stamps associated with the data and discard extra data values for the selected data tags falling between the five minute intervals to be sent to the cloud platform.

Cloud proxy device 702 can also include an aggregation component 706 configured to combine related data according to one or more predefined aggregation instructions. For example, after data from industrial devices $714_1$-$714_N$ has been time-stamped, contextualized, and filtered, aggregation component 706 can identify related data, which may originate from multiple data sources, and combine the related data into a common upload for delivery to a cloud-based service or application. The resulting refined data 716 can be pushed to the cloud via cloud interface component 704.

While the exemplary cloud proxy device of FIG. 7 is described as including a time stamp component 712, a context component 718, a filter component 708, and an aggregation component 706, it is to be appreciated that cloud proxy device 702 can include any suitable combination of data refinement functions according to the needs of the user and the requirements of the particular cloud-based services being used. For example, cloud proxy device 702 may compress, encrypt, and/or reformat the collected industrial data prior to pushing the data to the cloud-based service.

Figure 10:
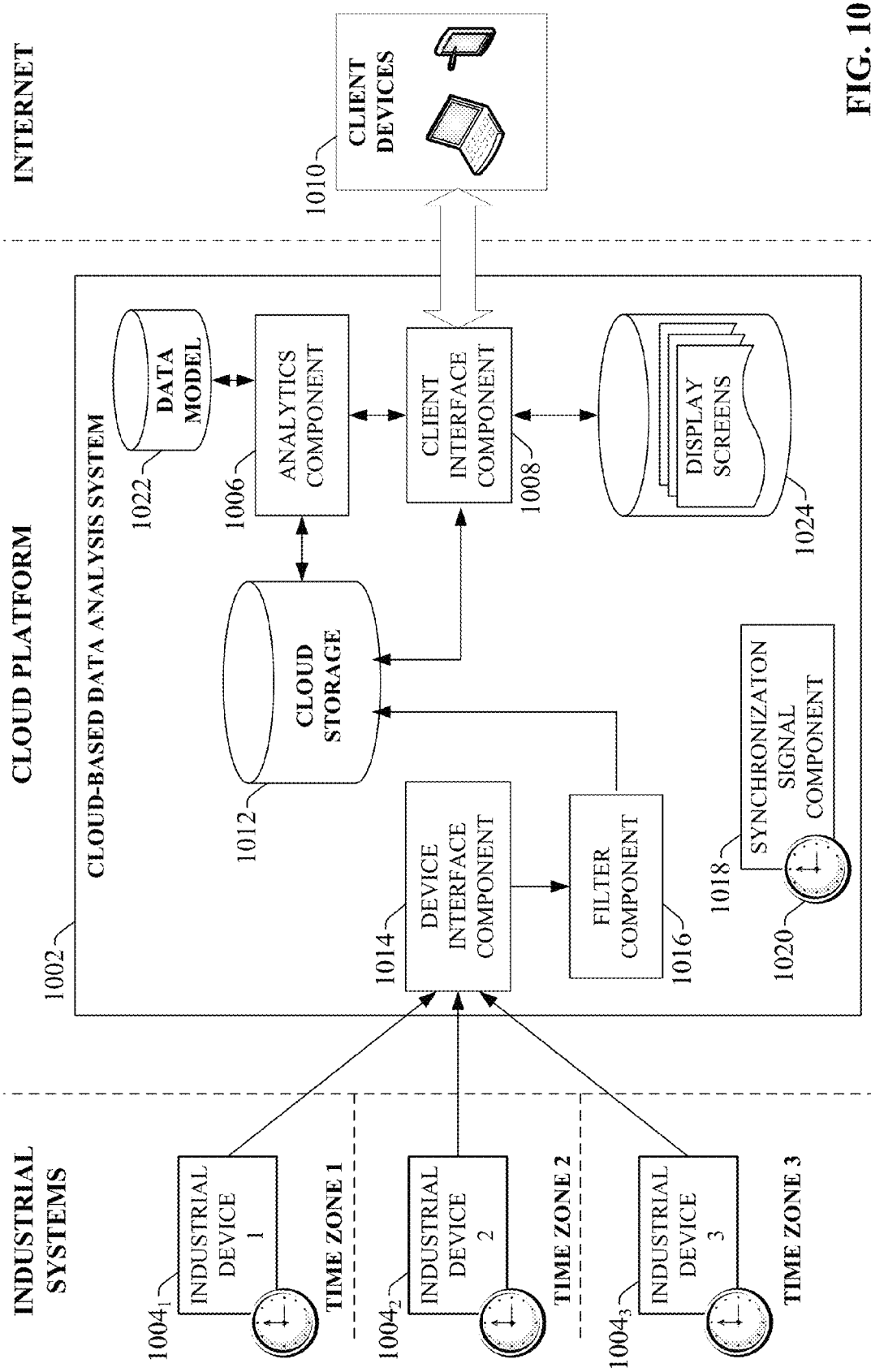
FIG. 10 illustrates an exemplary cloud-based data analysis system that can process time-stamped industrial data from multiple locations.

As noted above, time-stamping of industrial data at the plant level or enterprise level prior to moving the data to the cloud platform can facilitate chronological aggregation and collective analysis of industrial data collected from different locations and time zones. Such collective analysis can lead to discovery of correlations and cause-and-effect relationships between events at different plant facilities that would be difficult to ascertain through individual analysis of disparate data sets. FIG. 10 illustrates an exemplary cloud-based data analysis system that can process time-stamped industrial data from multiple locations to provide useful views of system events. Cloud-based data analysis system 1002 can reside on a cloud platform and receive industrial data from respective industrial devices 1004. In one or more embodiments, data analysis system 1002 can reside and execute on the cloud platform as a cloud-based service, and access to data analysis system 1002 can be provided to customers as a subscription service by a provider of the services associated with data analysis system 1002.

In the present example, industrial devices 1004 reside at different locations associated with respective different time zones. For example, industrial devices 1004 may be devices of a global industrial enterprise in which manufacturing or business events at one location impact activities at another location. In another exemplary scenario, it may be desired to compare data corresponding to events at different locations (and different time zones) that happen during a given timeframe. In another example, it may be necessary to compare data at different facilities located in different time zone using the respective local times (e.g., how does 8:00 am shift data from the east coast facility compare with the 8:00 am shift data from the west coast facility). In such scenarios, the UTC time-stamps associated with the data collected from the different facilities can include a time zone offset or a time zone indicator that can be used to normalize the UTC time-stamps such that data corresponding to a local timeframe at a first facility can be compared with the corresponding local timeframe of the second facility.

In other exemplary scenarios, some or all of industrial devices 1004 may reside at different areas within the same facility. Some industrial devices 1004 may also be embedded within mobile systems, such as service vehicles or cargo trucks having built-in control systems or tracking systems, and thus have non-fixed locations.

As in previous examples, industrial devices 1004 can be any suitable industrial devices that generate or collect data in connection with monitoring or controlling respective industrial processes (e.g., industrial controllers, VFDs, operator interface terminals, meters, sensors, etc.). Industrial devices 1004 can also be devices associated with higher level systems, such supervisory control systems, batch systems, business intelligence systems, ERP systems, etc. Industrial devices 1004 may also be machine-level or site-level data historians that collect and store historical production data for medium-term or long-term (e.g., archival) storage. In some configurations, industrial devices 1004 can comprise cloud proxy devices (such as industrial device $506_1$, firewall box 612, or a stand-alone, dedicated proxy device) that receive industrial data from multiple industrial devices and send the collected data to the cloud platform.

The respective industrial devices 1004 can include time stamp components (similar to time stamp components 208, 312, 410, 510, 610, or 712 described above) configured to apply a time-stamp to respective items of industrial data prior to sending the data to data analysis system 1002 residing on the cloud platform. To ensure that time-stamped data received from industrial devices 1004 conforms to a common time standard, data analysis system 1002 includes a synchronization signal component 1018 that generates and sends a synchronization signal (similar to synchronization signal 324 of FIG. 3) to industrial devices 1004. The synchronization signal synchronizes the internal device clocks of industrial devices 1004 with a global clock 1020 maintained by data analysis system 1002. Thus, time stamps applied to data events at each location will accurately reflect a time that the event occurred relative to time stamped events at the other locations. It is to be appreciated that time stamps can still be viewed locally at each industrial device 1004 in local time zone format. However, time stamps sent to data analysis system 1002 can be formatted according to a common time zone, or can be provided to data analysis system 1002 using a universal time notation that is synchronized to cloud clock 1020. Alternatively, time stamps sent to data analysis system 1002 can be formatted to conform to the local time zone of the respective devices 1004, but can additionally include a UTC offset or time zone indicator that can be used by data analysis system 1002 to normalize the time stamp data between time zones as needed. It is to be appreciated that clock synchronization may be effected by means other than signal-based synchronization (e.g., a synchronization service that runs on the industrial devices, a protocol by which the industrial devices requests the current time from a master time-keepings source, etc.).

In some embodiments, industrial devices 1004 can send their respective time-stamped industrial data to the cloud-based data analysis system 1002 at a frequency defined by data analysis system 1002. For example, an administrator or other user having suitable administrative privileges can define an upload frequency individually for the respective industrial devices, and device interface component 1014 can provide corresponding configuration instructions to the respective industrial devices 1004 configuring the upload frequencies accordingly. Alternatively or in addition, data analysis system 1002 may dynamically select a suitable upload frequency for the respective industrial devices 1004 during operation. For example, in order to control costs associated with cloud resource utilization, an administrator of data analysis system 1002 can, in one or more embodiments, configure a maximum total bandwidth usage for the data analysis system 1002, such that the total instantaneous bandwidth usage for data traffic between the industrial devices 1004 and the cloud-based data analysis system 1002 is not to exceed the configured maximum bandwidth. In such embodiments, the data analysis system 1002 can monitor the total bandwidth utilization substantially in real-time, and dynamically reduce the upload frequency of one or more industrial devices 1004 in response to a determination that the total bandwidth usage is approaching the defined maximum bandwidth. In another example, an administrator can configure a limit on the total amount of cloud storage to be used for cloud-based data collection. Accordingly, if data analysis system 1002 determines that this storage limit is being approached, the data analysis system 1002 can send an instruction to one or more industrial devices 1004 to reduce their upload frequencies, thereby slowing the consumption of cloud storage resources. In some embodiments, cloud-based data analysis system 1002 can select which industrial devices 1004 are to be adjusted based on respective criticalities of the control systems associated with the industrial devices 1004. For example, cloud-based data analysis system 1002 can maintain individual device profiles (not shown) defining relative priorities of the industrial systems associated with each industrial device, and can leverage this information in connection with determining which industrial devices 1004 are to be selected for reduced upload frequency in the event that one or more cloud resources are being used at an excessive rate.

Time-stamped industrial data is received from industrial devices 1004 at device interface component 1014, which can store the received data on cloud storage 1012. Cloud storage 1012 can comprise a subset of the cloud platform's storage resources provisioned to an owner of the industrial systems (e.g., an industrial enterprise) for the purpose of storing the received industrial data. For example, cloud storage 1012 can be provided to an industrial enterprise as part of a subscription service that includes access to the cloud-based data analysis system 1002 and its associated cloud services. In some embodiments, the received data may be filtered by a filter component 1016 prior to being moved to cloud storage 1012. Similar to local filter components described above (e.g., filter component 708 of FIG. 7), filter component 1016 can be configured to remove redundant data items or data not needed by the cloud-based data analysis system 1002 in accordance with any specified filtering criterion. For example, filter component 1016 can be configured to discard certain data values if the values fall outside a defined range indicative of a faulty data reading. Filter component 1016 can also be configured to identify redundant data items received from two different devices. For example, in some scenarios, a pressure value provided by a pressure meter may be duplicated in the data table of an industrial controller, and both values may be provided to the cloud platform via device interface component 1014. In such an instance, filter component 1016 can be configured to identify the duplicated data items (e.g., by virtue of a common data tag name or other identification methodology) and discard one of the duplicated values. If data provided by industrial devices 1004 include contextual metadata, filter component 1016 can be configured to filter the data based on some aspect of this contextual metadata.

Once the time-stamped (and optionally filtered) data has been stored on cloud storage 1012, the data can be provided to one or more client devices 1010 in any suitable viewing format for visual analysis. For example, data analysis system 1002 can include a client interface component 1008 that serves predesigned interface displays to any Internet-capable client device 1010 having access privileges to cloud-based data analysis system 1002, and render selected subsets of the stored industrial data via the display screens using the client device's native display capabilities. To this end, a set of pre-configured display screens 1024 can be stored on cloud storage associated with data analysis system 1002, and the client interface component 1008 can deliver selected display screens in response to invocation by the client devices 1010. The display screens 1024 can be developed, for example, using a development environment provided by the cloud-based data analysis system 1002. In one or more embodiments, the cloud-based data analysis system 1002 can provide this development environment as a cloud service, allowing a developer to remotely access a set of cloud-side interface screen development tools to facilitate design of interface screen layouts, data links, graphical animations, and navigation links between screens. In such embodiments, the interface screen development environment can allow the developer to leverage cloud resources (e.g., cloud storage and processing resources) to develop a set of display screens 1024 for a given operator interface application to be run on the data analysis system 1002. Alternatively, display screens 1024 can comprise display screens developed by external display development applications and uploaded to the cloud platform for execution by data analysis system 1002 during runtime.

Each of the display screens 1024 can include display tags defining which data items in cloud storage 1012 are to be displayed on the respective screens, formats for the respective data items, desired graphical animations to be associated with the respective data items, graphical elements to be included on the respective display screens (e.g., externally defined graphical elements definitions), and other such configuration information. Some display screens 1024 can also be configured to render alarm or informational messages in response to determinations that subsets of the industrial data provided by industrial devices 1004 have met certain conditions (e.g., in response to a determination that a given industrial parameter has exceeded a defined setpoint, or that a defined production goal has been met). Since industrial data can be received from multiple industrial systems (possibly at diverse geographical locations), alarms, notification events, animation triggers, and the like can be defined in terms of composite industrial data values for multiple industrial systems, allowing the industrial systems to be viewed and analyzed from a high-level enterprise perspective, with chronological relationships between events at different locations accurately represented by virtue of the synchronized time stamps.

For example, consider a scenario in which a particular product is being produced at three different facilities. The respective industrial devices 1004 can deliver production statistics to the device interface component 1014, and the data analysis system 1002 can aggregate these production statistics substantially in near real-time to yield composite data (e.g., a total production count for all three facilities) even though the three facilities may not be communicatively networked together over a data network. One or more of the displays screens 1024 can be configured to display these composite production statistics, trigger alarms or graphical animations as a function of the composite statistics, etc. Client interface component 1008 can deliver these display screens to authorized client devices 1010 having Internet access and suitable authorization credentials, providing owners of the client devices 1010 with an enterprise-level view of the multiple industrial systems monitored by cloud-based data analysis system 1002.

Since the time stamps applied to the stored industrial data conform to a common time standard (by virtue of synchronization of the internal clocks of the respective devices), data events at different locations can be aggregated into a chronological presentation in order to accurately document a sequence of events that occurred at geographically distributed locations. Turning briefly to FIG. 11, an exemplary chronological aggregation is illustrated. A first data set 1102 comprises condenser inlet pressure data received from a first facility, and a second data set 1104 comprises evaporator discharge pressure data received from a second facility. Data sets 1102 and 1104 have been time-stamped by their respective industrial devices prior to being moved to cloud storage 1012. The time stamps include a date component, a UTC timestamp component, and a UTC offset (eight hours for Facility 1, and five hours for Facility 2). Using these time stamps (in particular, the data and UTC components of the time stamps) data sets 1102 and 1104 can be aggregated into a chronological data set 1106 that presents the geographically diverse data sets as a time series of events. This presentation can be provided by client interface component 1008 to authorized client devices 1010 for visual analysis. Such chronological presentations can bring together geographically diverse but related data events into a single presentation that can be easily viewed and analyzed by plant personnel to determine, for example, a root cause of a system abnormality. When data set 1106 is to be sent to a client device, client interface component 1008 can determine a local time zone of the requesting client device and adjust the time stamp data associated with the respective data tag values to conform to the local time zone of the requesting client device.

The foregoing example describes chronological aggregation of data sets 1102 and 1104 as being performed on the cloud platform. However, in some scenarios, chronological aggregation can be performed on the plant-floor or enterprise level prior to sending the aggregated data set to the cloud platform. For example, a cloud proxy device (such as cloud proxy devices 506₁, 612, or 702 described above) can receive data sets 1102 and 1104 from respective different industrial devices and time stamp the data sets. The cloud proxy device can then aggregate data sets 1102 and 1104 into chronological data set 1106 and send data set 1106 to the cloud platform for storage and/or analysis. This aggregation can be performed, for example, by aggregation component 706 described above in connection with FIG. 7.

Figure 12:
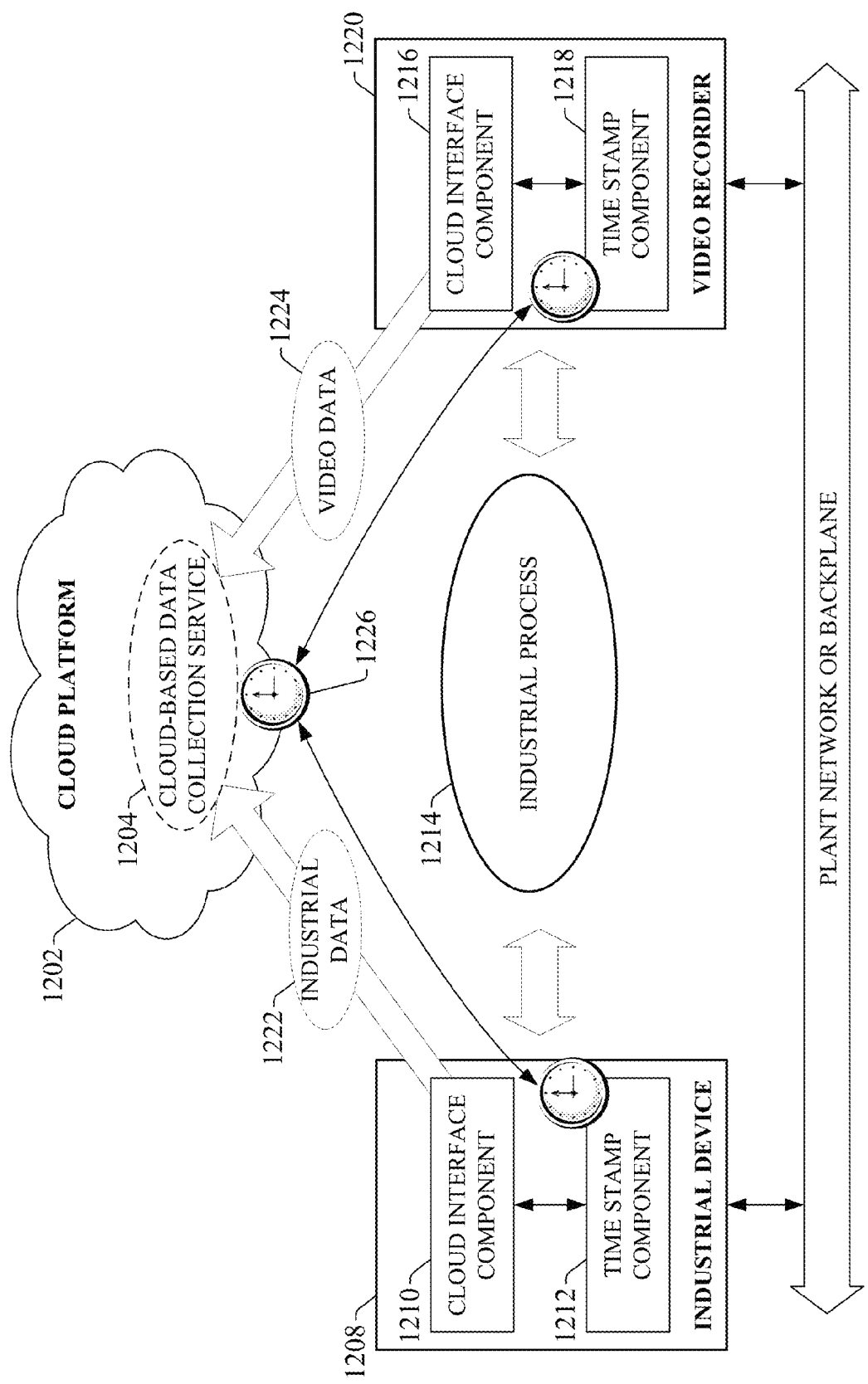
FIG. 12 illustrates an exemplary video recording architecture that uses synchronized time-stamping to many video footage with measured process data.

One or more time-stamping aspects described herein can also be used to support delivery of multimedia presentations to client devices 1010. For example, in addition to presentation of production data retrieved from industrial controllers or other devices, users may wish to view a video or audio-video recording of an industrial process stored on the cloud platform. Accordingly, one or more of industrial devices 1004 can be a video recorder (e.g., a web camera) that records video or audio-video images of a machine associated with the industrial process and provides the video data to the cloud platform for storage and subsequent viewing. FIG. 12 illustrates an exemplary video recording configuration that uses synchronized time-stamping to marry video footage with measured process data. In this example, an industrial device 1208 measures or generates industrial data associated with an industrial process 1214. As in previous examples, industrial device 1208 includes a time stamp component 1212 configured to apply time stamps to respective data items, and a cloud interface component 1210 configured to communicatively couple industrial device 1208 to cloud platform 1202 and deliver the time-stamped industrial data 1222 to a cloud-based data collection service 1204. In addition, a video recorder 1220 has been set up to record video footage of a particular machine associated with industrial process 1214. Video recorder 1220 can also include a time stamp component 1218 that assigns time data (e.g., a time code) to the recorded video footage. For example, time stamp component 1218 can assign time data to each frame of the video footage indicating a time that the image in the frame was recorded. Video recorder 1220 can also include a cloud interface component 1216 that couples video recorder 1220 to the cloud platform 1202 and sends the recorded video data 1224 in digital format to cloud platform 1202 for cloud-based storage.

Using techniques described above in connection with FIGS. 3 and 4, cloud platform 1202 can send synchronization signals to industrial device 1208 and video recorder 1220 to synchronize the internal clocks associated with time stamp components 1212 and 1218 with cloud clock 1226. Alternatively, industrial device 1208 and video recorder 1220 can be synchronized to an atomic clock, GPS, or network-based protocol served from an external Internet server. Synchronizing the internal clocks of the respective devices facilitates accurate alignment of time-stamped industrial data 1222 with video data 1224 at cloud platform 1202. That is, cloud-based data collection service 1204 can marry industrial data 122 with video data 1224 by aligning the time stamps between the two types of data, and provide a unified multimedia presentation to a user (e.g., to client devices 1010). For example, data collection service 1204 can generate a playback display that overlays select subsets of industrial data 1222 on the digital video footage during playback of the video, where the time stamps on the respective data values are used to determine the video frames on which the data will be superimposed. This can provide a composite view that allows remote maintenance personnel to visually associate production data events (e.g., abnormal temperature or pressure values, machine statuses, alarm events, etc.) with visual machine performance, providing a helpful troubleshooting tool for remotely tracing an origin of abnormal machine behavior.

Returning now to FIG. 10, one or more embodiments of cloud-based data analysis system 1002 can include an analytics component 1006 to facilitate collective analysis of the time-stamped data stored on cloud storage 1012. Analytics component 1006 can be configured to combine and correlate the stored data to provide accurate, representative, and meaningful information about system events. For example, analytics component 1006 can identify inter-dependencies between data sets regardless of location of origin based in part on the time-stamps associated with respective data items. For example, analytics component 1006 may determine, based on analysis of time-stamped industrial data gathered from multiple facilities, that a prolonged alarm condition or system event that results in downtime of a particular production area at a first location is typically followed by a drop in inventory levels at a second location (e.g., a warehouse) four to five days following the event. In some embodiments, analytics component 1006 can leverage such determinations to perform prognostic analysis on the stored industrial data. For example, after the foregoing determination has been established, analytics component 1006 can identify when the alarm condition has occurred and, if the alarm condition exceeds the duration identified as triggering the downstream inventory reduction, output a predictive notification that inventory levels are likely to drop at the second location within a predicted period of time. In one or more embodiments, analytics component 1006 can also predict anomalous system performance (e.g., alarm states, downtime conditions, machine failure, etc.) based on historical time-stamped values and correlations between data sets.

To facilitate analysis of the time-stamped data stored on cloud storage 1012, some embodiments of analytics component 1006 can reference a data model 1022 that models the industrial enterprise and its associated industrial and business-level devices. Data model 1022 can represent the industrial enterprise in terms of multiple hierarchical levels (e.g., the hierarchical levels depicted in FIG. 9), where each level comprises units of the enterprise organized as instances of types and their properties. Exemplary types can include, for example, assets (e.g., pumps, extruders, tanks, fillers, welding cells, utility meters, etc.), structures (e.g., production lines, production areas, plants, enterprises, production schedules, operators, etc.), and processes (e.g., quality audit, repairs, test/inspection, batch, product parameters, shifts, etc.). Data model 1022 can represent industrial controllers, devices, machines, or processes as data structures (e.g., type instances) within this enterprise hierarchy to provide context for data received from industrial devices 1004 relative to the enterprise as a whole. Thus, analytics component 1006 can determine correlations between data sets in cloud storage 1012 based in part on the logical, functional, and hierarchical relationships between industrial devices 1004 defined by data model 1022.

One or more embodiments of the cloud-based architecture described above can also provide a cloud-based mechanism for tracking product through various geographically diverse stages of an industrial enterprise, including manufacturing, distribution, sales, and end use. For example, time-stamped production data associated with a particular manufactured product or component thereof can be stored in cloud storage 1012, providing a record of when the product or component passed through a particular production area. The time-stamped production data can be linked to the particular product or component using, for example, a barcoding system that marks individual items of product with a unique barcode and reads the barcode at various points throughout the manufacturing process using mounted or hand-held barcode readers. The barcode provides a consistent identifier that can be used to track the item through multiple plant facilities, as well as inventory and distribution facilities, where the barcode can be read, time-stamped by the barcode reader, and moved to cloud storage 1012. As described in previous examples, the time stamp components associated with the respective barcode readers can be synchronized with the cloud clock to ensure that the temporal relationships between part detection times and other recorded system events remain accurate.

Figure 13:
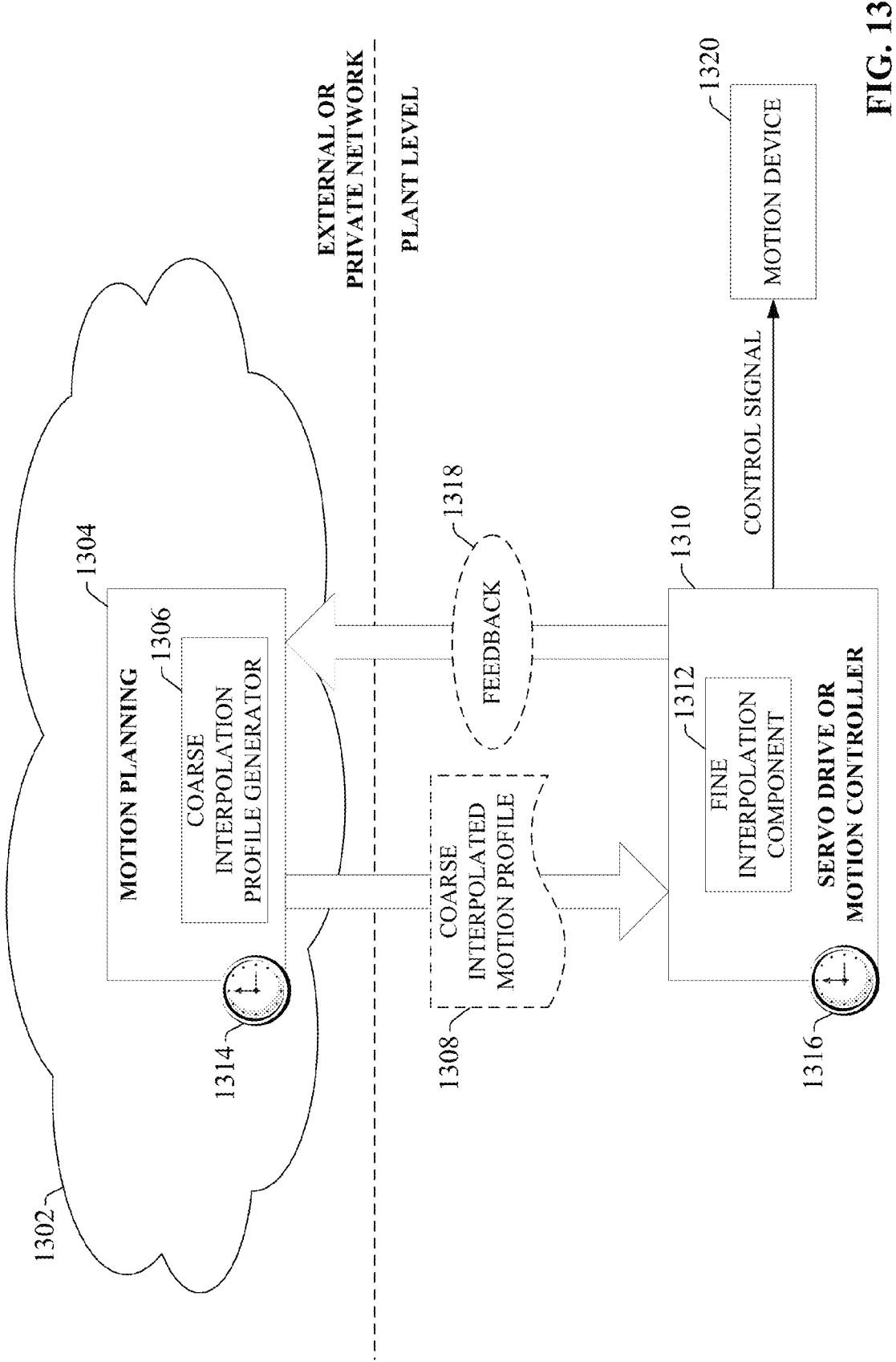
FIG. 13 illustrates an exemplary cloud-based motion control architecture.

Some types of industrial applications that employ distributed clocks may require highly accurate clock synchronization between the distributed device clocks. For example, some motion control applications may require synchronization accuracy within the range of hundreds of nanoseconds. However, cloud-based motion control can be implemented if coarse interpolation of the motion profile is performed in the cloud platform, while fine interpolation of the motion profile is performed in the motion devices (e.g., servo drives). FIG. 13 illustrates an exemplary cloud-based motion control system based on this concept. In this example, a servo drive or motion controller 1310 controls the position and speed of a motion device 1320 (e.g., a motor). Motion device 1320 operates under the guidance of servo drive or motion controller 1310, which sends position and/or speed control instructions to motion device 1320 via a control signal in accordance with a user-defined control algorithm.

According to one or more embodiments, cloud platform 1302 can host a cloud-based motion planning system 1304. The user-defined control algorithm for controlling position and/or velocity of motion device 1320 can execute on the motion planning system 1304. When the motion planning system 1304 determines that the motion device 1320 must move to a new position or alter its velocity (based on the motion algorithm as well as feedback 1318 indicating a current state of the motion device 1320 or its associated automation system), motion planning system 1304 can interpolate a position or velocity trajectory—referred to as a motion profile—for transitioning the motion device 1320 from its current position/velocity to the target position/velocity. The motion profile can define the motion device's velocity, acceleration, and/or position over time as the system moves from the current state to the target state. Once this motion profile is calculated, the motion planning system 1304 can send the motion profile to the servo drive or motion controller 1310, which translates the motion profile into appropriate control signaling for moving motion device 1320 through the trajectory defined by the motion profile.

To allow for possible synchronization inaccuracies between the internal clock 1314 of the motion planning system and the internal clock 1316 of the servo drive or motion controller 1310, the cloud-based motion control system can employ a two-stage interpolation methodology for generating the motion profile, whereby coarse interpolation is performed in the cloud platform 1302, and fine interpolation is performed on the plant level by the servo drive or motion controller 1310. To this end, cloud-based motion planning system 1304 can include a coarse interpolation profile generator 1306 that generates a coarse interpolated motion profile 1308. Coarse interpolated motion profile 1308 defines a coarse trajectory as a set of position or velocity values over time at a given update rate (e.g., 100s of milliseconds between data points). Motion planning system 1304 can then send the coarse interpolated motion profile 1308 to servo drive or motion controller 1310 from the cloud platform. A fine interpolation component 1312 on the servo drive or motion controller 1310 can then perform fine interpolation on the coarse interpolated motion profile 1308. For example, fine interpolation component 1312 can interpolate additional position and/or velocity data points between the coarse data points defined in the coarse interpolated motion profile 1308 to yield a final motion profile having a finer update rate (e.g., on the level of microseconds or low milliseconds between data points). This final motion profile can then be translated by the servo drive or motion controller 1310 to generate the control signal that transitions motion device 1320 through the defined trajectory.

FIGS. 14-18 illustrate various methodologies in accordance with one or more embodiments of the subject application. While, for purposes of simplicity of explanation, the one or more methodologies shown herein are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. Furthermore, interaction diagram(s) may represent methodologies, or methods, in accordance with the subject disclosure when disparate entities enact disparate portions of the methodologies. Further yet, two or more of the disclosed example methods can be implemented in combination with each other, to accomplish one or more features or advantages described herein.

Figure 14:
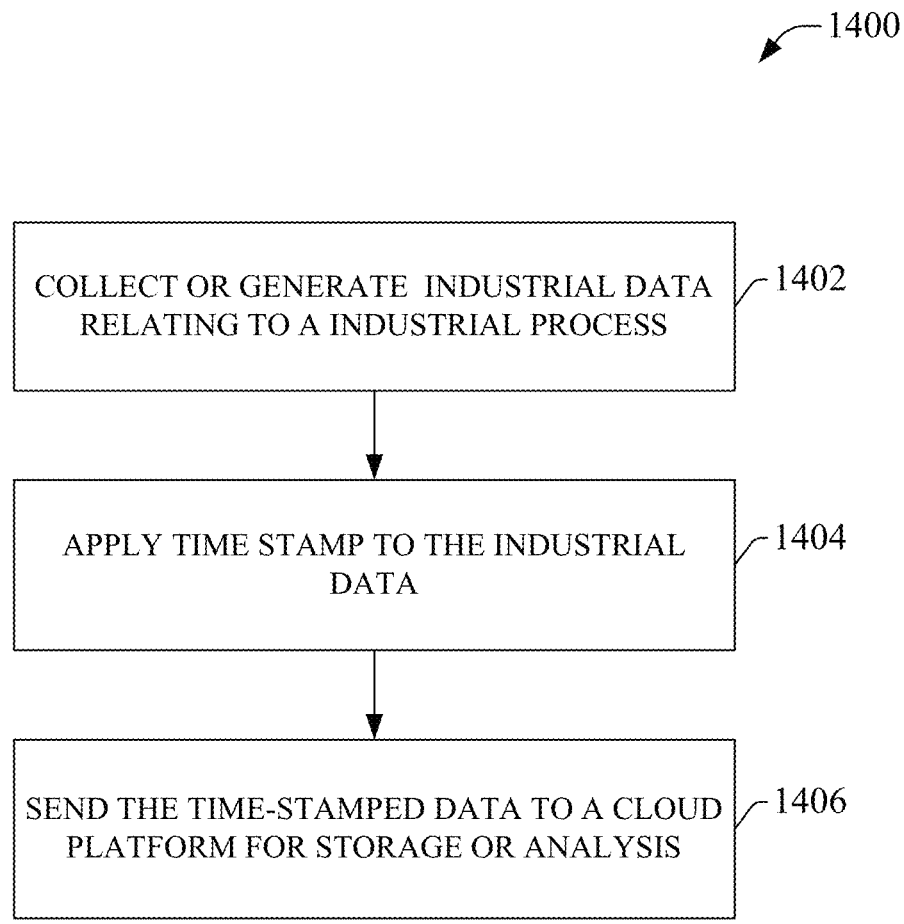
FIG. 14 is a flowchart of an example methodology for time-stamping industrial data for cloud-based storage and analysis.

FIG. 14 illustrates an example methodology 1400 for time-stamping industrial data for cloud-based storage and analysis. Initially, at 1402 industrial data relating to an industrial process is collected or generated. The industrial data can be collected or generated by a cloud-capable industrial device, including but not limited to an industrial controller, a VFD, an operator interface terminal, a meter, a sensor, a data historian, or other such device. At 1404, a time stamp is applied to the industrial data reflecting a time that data was measured, received, or generated by the industrial device. At 1406, the time-stamped data is sent to a cloud platform for cloud-based storage or analysis. At the cloud platform, the time-stamped data can be aggregated or collectively analyzed with time-stamped data from other sources.

Figure 15:
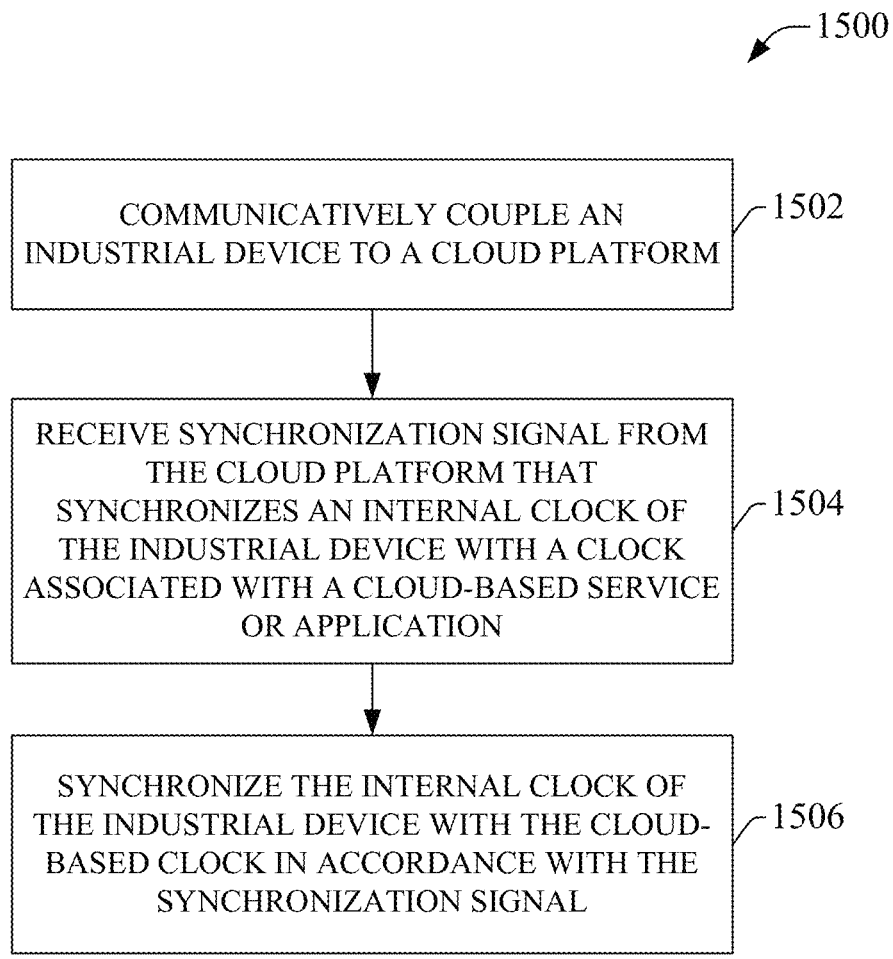
FIG. 15 is a flowchart of an example methodology for synchronizing an internal clock of an industrial device with a cloud-based clock.

FIG. 15 illustrates an exemplary methodology 1500 for synchronizing an internal clock of an industrial device with a cloud-based clock. Initially, at 1502, an industrial device is communicatively coupled to a cloud platform. In one or more embodiments, the industrial device can connect to the cloud platform over a generic Internet layer using a cloud interface component. At 1504, a synchronization signal is received from the cloud platform that synchronizes the internal clock of the industrial device with a clock associated with a cloud-based service or application residing on the cloud platform. Alternatively, the industrial device can be synchronized to an atomic clock, a GPS, or a network-based protocol based on synchronization data provided by an external Internet server.

At 1506, the internal clock of the industrial device is synchronized with the cloud-based clock in accordance with the synchronization signal.

Figure 16:
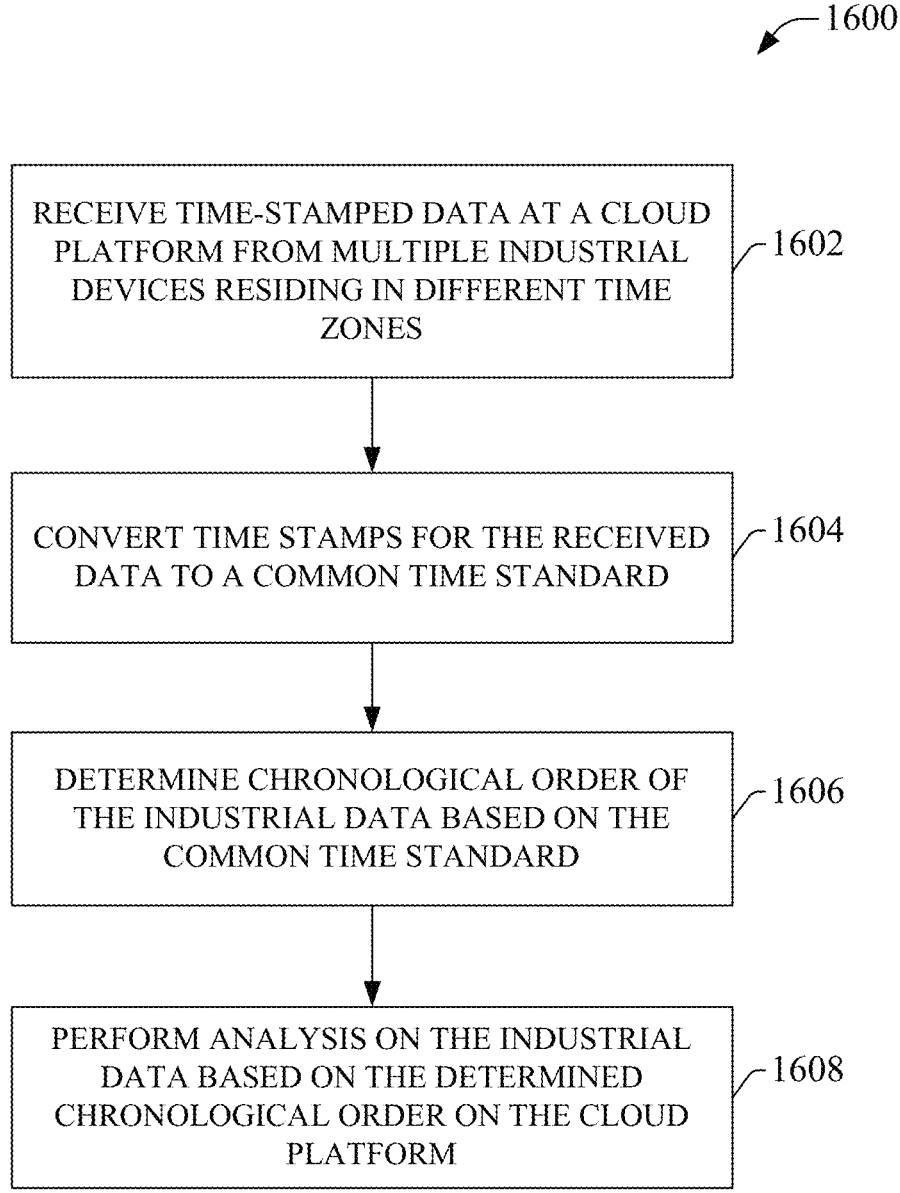
FIG. 16 is a flowchart of an exemplary methodology for time-based analysis of industrial data received from different time zones.

FIG. 16 illustrates an exemplary methodology 1600 for time-based analysis of industrial data received from different time zones. Initially, at 1602, time-stamped data from multiple industrial devices residing in different time zones is received at a cloud platform. At 1604, the time stamps for respective items of the industrial data are converted to a common time standard. This step may be omitted if the data is received already formatted according a UTC-plus-offset standard (e.g., the time stamp includes a UTC time component and an offset component that is based on the local time zone from which the data originated). At 1606, a chronological order of the collective industrial data is determined based on the common time standard. At 1608, analysis is performed on the industrial data at the cloud platform based on the chronological order determined at step 1606.

Figure 17:
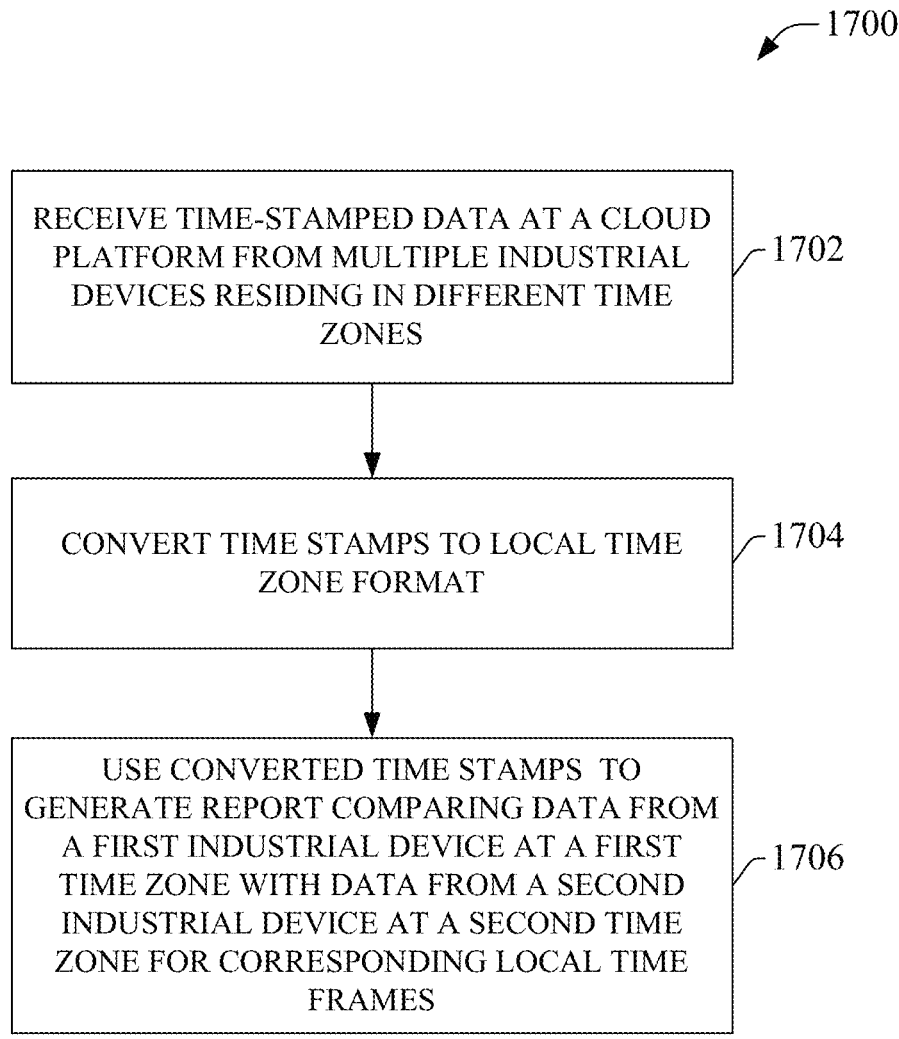
FIG. 17 is a flowchart of an example methodology for analyzing time-stamped industrial data received from different time zones.

FIG. 17 illustrates an exemplary methodology 1700 for comparing time-stamped industrial data collected from disparate time zones. Initially, at 1702, time-stamped data from multiple industrial devices residing in different time zones is received at a cloud platform. In some embodiments, the data can be received formatted as a UTC time with an associated local time offset. At 1704, the time stamps for the respective data items are converted to the local times corresponding to the time zone from which each data item was received. For example, data received from a first time zone may have a UTC offset of five hours, while data from a second time zone may have a UTC offset of eight hours. These offsets can be added to the UTC times to format each time stamp according to the local time standard of the originating time zone. At 1706, the converted time stamps are used to generate a report that compares data from a first industrial device at a first time zone with data from a second industrial device at a second time zone for corresponding local time frames. For example, a user may wish to compare data generated during the 8:00 am-9:00 am hour (local time) at a west coast facility with data generated during the 8:00 am-9:00 am hour (local time) at an east coast facility. Although these hours occur at different universal times at the different facilities, the time zone offset allows data from corresponding local time frame to be compared for the two facilities.

Figure 18:
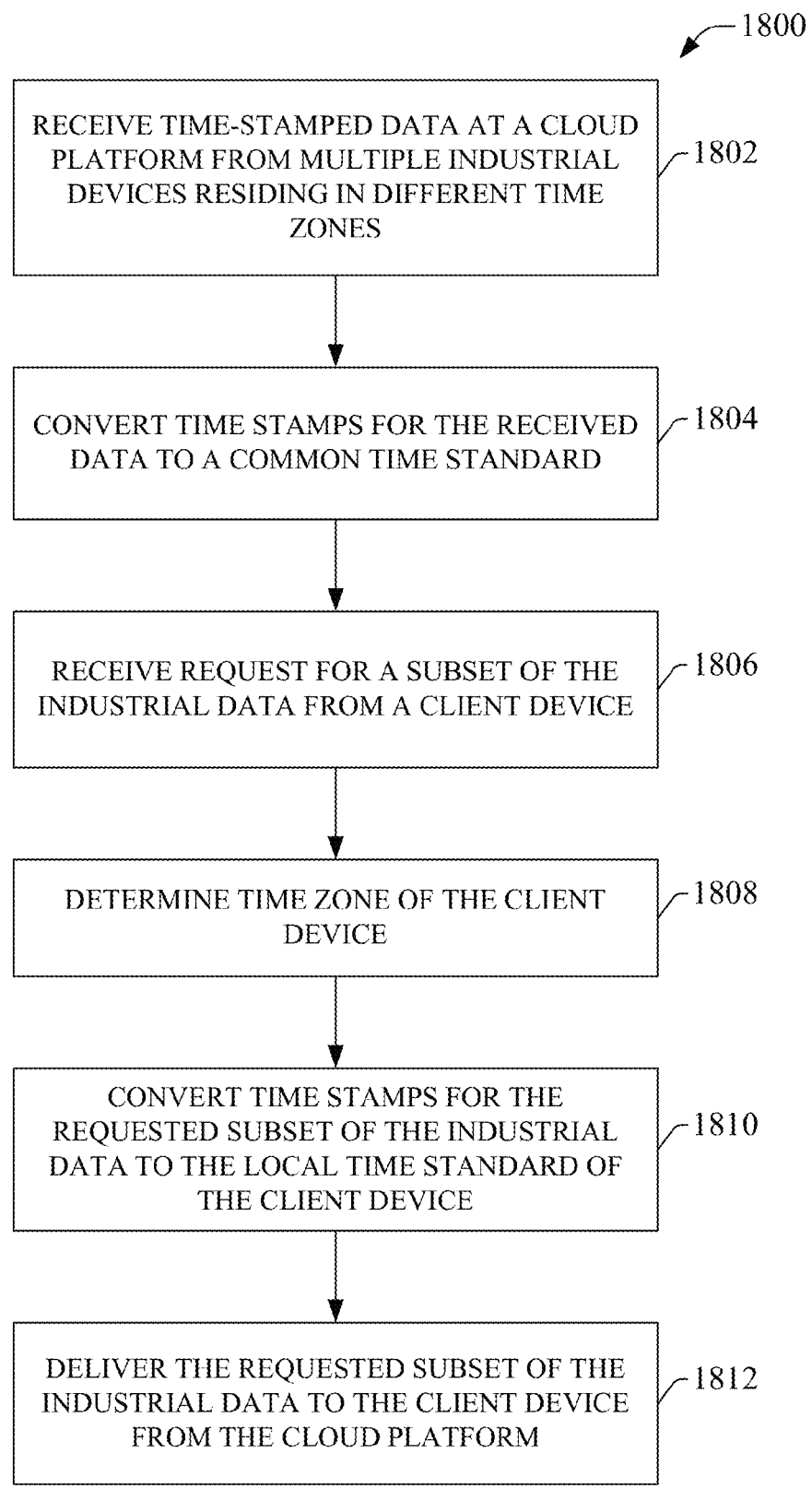
FIG. 18 is a flowchart of an example methodology for provisioning time-stamped industrial data to clients residing in different time zones using a cloud platform.

FIG. 18 illustrates an exemplary methodology 1800 for provisioning time-stamped industrial data to clients residing in different time zones using a cloud platform. Initially, at 1802, time-stamped industrial data is received at a cloud platform from multiple industrial devices residing in at least two different time zones. At 1804, the time stamps associated with respective items of the received industrial data are converted to a common time standard if the time stamps are not already in a UTC format. At 1806, a request for a subset of the industrial data is received at the cloud platform from a client device. At 1808, the time zone of the client device is determined by a cloud-based service running on the cloud platform. In some scenarios, the local time zone may be explicitly provided by the client device as part of the data request. However, if the client device does not (or is not able to) provide a local time zone, the cloud platform may include a service for determining the time zone of origin for a data request. At 1810, the time stamps for the requested subset of the industrial data are converted to the local time standard of the requesting device based on the time zone determined at step 1808. At 1812, the requested subset of the industrial data is delivered to the client device from the cloud platform.

Embodiments, systems, and components described herein, as well as industrial control systems and industrial automation environments in which various aspects set forth in the subject specification can be carried out, can include computer or network components such as servers, clients, programmable logic controllers (PLCs), automation controllers, communications modules, mobile computers, wireless components, control components and so forth which are capable of interacting across a network. Computers and servers include one or more processors—electronic integrated circuits that perform logic operations employing electric signals—configured to execute instructions stored in media such as random access memory (RAM), read only memory (ROM), a hard drives, as well as removable memory devices, which can include memory sticks, memory cards, flash drives, external hard drives, and so on.

Similarly, the term PLC or automation controller as used herein can include functionality that can be shared across multiple components, systems, and/or networks. As an example, one or more PLCs or automation controllers can communicate and cooperate with various network devices across the network. This can include substantially any type of control, communications module, computer, Input/Output (I/O) device, sensor, actuator, and human machine interface (HMI) that communicate via the network, which includes control, automation, and/or public networks. The PLC or automation controller can also communicate to and control various other devices such as I/O modules including analog, digital, programmed/intelligent I/O modules, other programmable controllers, communications modules, sensors, actuators, output devices, and the like.

The network can include public networks such as the internet, intranets, and automation networks such as control and information protocol (CIP) networks including DeviceNet, ControlNet, and Ethernet/IP. Other networks include Ethernet, DH/DH+, Remote I/O, Fieldbus, Modbus, Profibus, CAN, wireless networks, serial protocols, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

Figure 19:
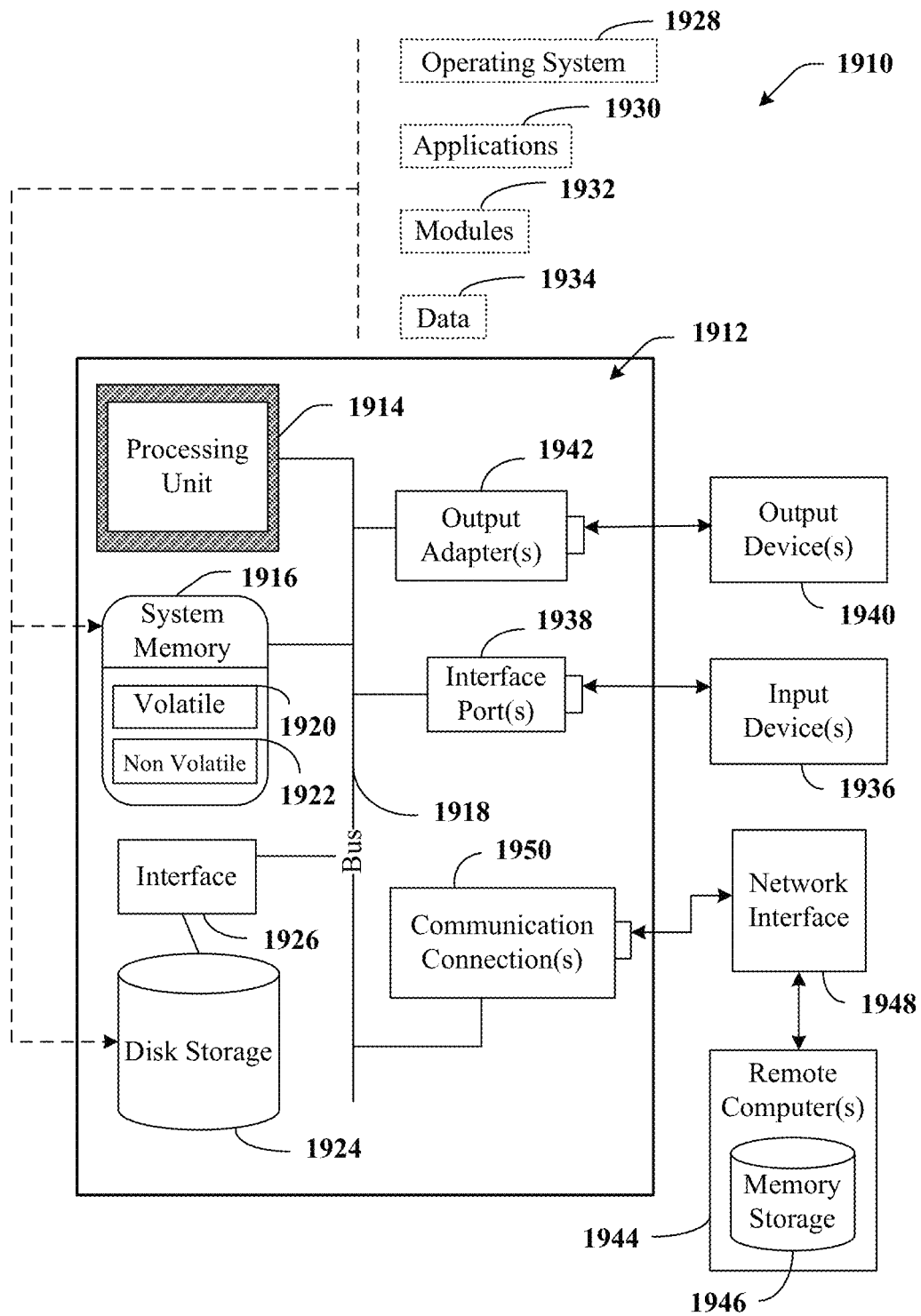
FIG. 19 is an example computing environment.
Figure 20:
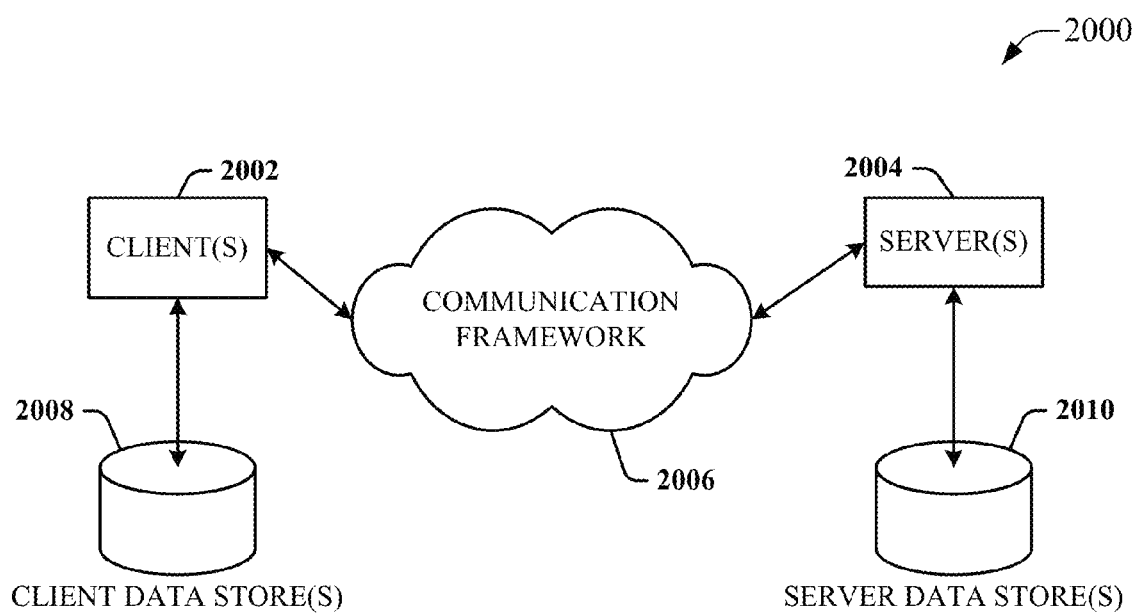
FIG. 20 is an example networking environment.

In order to provide a context for the various aspects of the disclosed subject matter, FIGS. 19 and 20 as well as the following discussion are intended to provide a brief, general description of a suitable environment in which the various aspects of the disclosed subject matter may be implemented.

With reference to FIG. 19, an example environment 1910 for implementing various aspects of the aforementioned subject matter includes a computer 1912. The computer 1912 includes a processing unit 1914, a system memory 1916, and a system bus 1918. The system bus 1918 couples system components including, but not limited to, the system memory 1916 to the processing unit 1914. The processing unit 1914 can be any of various available processors. Multi-core microprocessors and other multiprocessor architectures also can be employed as the processing unit 1914.

The system bus 1918 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 1916 includes volatile memory 1920 and nonvolatile memory 1922. The basic input/output system (BIOS), containing the basic routines to transfer information between elements within the computer 1912, such as during start-up, is stored in nonvolatile memory 1922. By way of illustration, and not limitation, nonvolatile memory 1822 can include read only memory (ROM), programmable ROM (PROM), electrically programmable ROM (EPROM), electrically erasable PROM (EEPROM), or flash memory. Volatile memory 1920 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1912 also includes removable/non-removable, volatile/non-volatile computer storage media. FIG. 19 illustrates, for example a disk storage 1924. Disk storage 1924 includes, but is not limited to, devices like a magnetic disk drive, floppy disk drive, tape drive, Jaz drive, Zip drive, LS-100 drive, flash memory card, or memory stick. In addition, disk storage 1924 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1924 to the system bus 1918, a removable or non-removable interface is typically used such as interface 1926.

It is to be appreciated that FIG. 19 describes software that acts as an intermediary between users and the basic computer resources described in suitable operating environment 1910. Such software includes an operating system 1928. Operating system 1928, which can be stored on disk storage 1924, acts to control and allocate resources of the computer 1912. System applications 1930 take advantage of the management of resources by operating system 1928 through program modules 1932 and program data 1934 stored either in system memory 1916 or on disk storage 1924. It is to be appreciated that one or more embodiments of the subject disclosure can be implemented with various operating systems or combinations of operating systems.

A user enters commands or information into the computer 1912 through input device(s) 1936. Input devices 1936 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1914 through the system bus 1918 via interface port(s) 1938. Interface port(s) 1938 include, for example, a serial port, a parallel port, a game port, and a universal serial bus (USB). Output device(s) 1940 use some of the same type of ports as input device(s) 1936. Thus, for example, a USB port may be used to provide input to computer 1912, and to output information from computer 1912 to an output device 1940. Output adapter 1942 is provided to illustrate that there are some output devices 1940 like monitors, speakers, and printers, among other output devices 1940, which require special adapters. The output adapters 1942 include, by way of illustration and not limitation, video and sound cards that provide a means of connection between the output device 1940 and the system bus 1918. It should be noted that other devices and/or systems of devices provide both input and output capabilities such as remote computer(s) 1944.

Computer 1912 can operate in a networked environment using logical connections to one or more remote computers, such as remote computer(s) 1944. The remote computer(s) 1944 can be a personal computer, a server, a router, a network PC, a workstation, a microprocessor based appliance, a peer device or other common network node and the like, and typically includes many or all of the elements described relative to computer 1912. For purposes of brevity, only a memory storage device 1946 is illustrated with remote computer(s) 1944. Remote computer(s) 1944 is logically connected to computer 1912 through a network interface 1948 and then physically connected via communication connection 1950. Network interface 1948 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1950 refers to the hardware/software employed to connect the network interface 1948 to the bus 1918. While communication connection 1950 is shown for illustrative clarity inside computer 1912, it can also be external to computer 1912. The hardware/software necessary for connection to the network interface 1948 includes, for exemplary purposes only, internal and external technologies such as, modems including regular telephone grade modems, cable modems and DSL modems, ISDN adapters, and Ethernet cards.

FIG. 20 is a schematic block diagram of a sample-computing environment 2000 with which the disclosed subject matter can interact. The sample-computing environment 2000 includes one or more client(s) 2002. The client(s) 2002 can be hardware and/or software (e.g., threads, processes, computing devices). The sample-computing environment 2000 also includes one or more server(s) 2004. The server(s) 2004 can also be hardware and/or software (e.g., threads, processes, computing devices). The servers 2004 can house threads to perform transformations by employing one or more embodiments as described herein, for example. One possible communication between a client 2002 and a server 2004 can be in the form of a data packet adapted to be transmitted between two or more computer processes. The sample-computing environment 2000 includes a communication framework 2006 that can be employed to facilitate communications between the client(s) 2002 and the server(s) 2004. The client(s) 2002 are operably connected to one or more client data store(s) 2008 that can be employed to store information local to the client(s) 2002. Similarly, the server(s) 2004 are operably connected to one or more server data store(s) 2010 that can be employed to store information local to the servers 2004.

What has been described above includes examples of the subject innovation. It is, of course, not possible to describe every conceivable combination of components or methodologies for purposes of describing the disclosed subject matter, but one of ordinary skill in the art may recognize that many further combinations and permutations of the subject innovation are possible. Accordingly, the disclosed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed subject matter. In this regard, it will also be recognized that the disclosed subject matter includes a system as well as a computer-readable medium having computer-executable instructions for performing the acts and/or events of the various methods of the disclosed subject matter.

In addition, while a particular feature of the disclosed subject matter may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

In this application, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks [e.g., compact disk (CD), digital versatile disk (DVD) . . . ], smart cards, and flash memory devices (e.g., card, stick, key drive . . .).

The invention claimed is:

1. An industrial device, comprising:
a memory that stores executable components;
a processor operatively coupled to the memory that executes the executable components, the executable components comprising:
a cloud interface component configured to communicatively couple the industrial device to a cloud platform that executes a motion planning system, to send feedback information indicating a current state of an industrial motion device to the motion planning system via the cloud platform, and to receive, from the cloud platform, a coarse interpolated motion profile generated by the motion planning system based on the feedback information, the course interpolated motion profile defining a trajectory as a set of position or velocity values over time at a first update rate;
a synchronization component configured to synchronize an internal clock of the industrial device with a master clock associated with the motion planning system;
a fine interpolation component configured to interpolate additional position or velocity values between the set of position or velocity values to yield a final motion profile comprising an updated set of position or velocity values over time at a second update rate that is greater than the first update rate; and
a control component configured to control motion of the industrial motion device in accordance with the final motion profile.

2. The industrial device of claim 1, wherein the synchronization component is further configured to synchronize the internal clock in accordance with at least one of a synchronization signal received from an atomic clock signal receiver, a global positioning system (GPS) receiver, a network-based time service, or a synchronization signal received from the cloud platform that synchronizes the internal clock with a cloud clock or a synchronization service that runs locally on the industrial device.

3. The industrial device of claim 1, further comprising a time-stamp component configured to associate a time stamp with industrial data measured or generated by the industrial device based on the internal clock to yield time-stamped data, wherein the cloud interface component is further configured to send the time-stamped data to the cloud platform.

4. The industrial device of claim 3, the executable components further comprising a context component configured to add contextual metadata to at least a subset of the industrial data.

5. The industrial device of claim 4, wherein the contextual metadata includes at least one of a production shift identifier, a production area identifier, a product identifier, a machine state identifier, an employee identifier, a lot number, an active alarm, or a hierarchical organizational tag.

6. The industrial device of claim 3, the executable components further comprising a filter component configured to determine a required data granularity defined by a filtering profile associated with the industrial device, and to discard items of the time-stamped data to yield the required data granularity prior to sending the time-stamped data to the cloud platform.

7. The industrial device of claim 6, wherein the filter component is further configured to at least one of remove data values of the time-stamped data that are outside a defined range or remove redundant data values of the time-stamped data.

8. The industrial device of claim 1, wherein the industrial device is an industrial controller.

9. The industrial device of claim 1, wherein the cloud interface component is configured to interface the industrial device with a cloud-based application executing on the cloud platform, wherein the cloud-based application is at least one of a data analysis application, a notification application, a business intelligence application, a visualization application, a reporting application, a storage application, a manufacturing execution system (MES) application, or an enterprise resource planning (ERP) application.

10. The industrial device of claim 1, the executable components further comprising an aggregation component configured to combine related data items of the time-stamped data into a single upload for delivery to the cloud platform.

11. The industrial device of claim 10, wherein the aggregation component is further configured to aggregate a first subset of the industrial data received from a first data source and a second subset of the industrial data received from a second source into a chronological data set based on time stamps associated with the first data set and the second data set by the time stamp component.

12. A method, comprising:
receiving, by an industrial device comprising at least one processor, a synchronization signal from a cloud platform;

synchronizing, by the industrial device, an internal clock of the industrial device with a cloud clock associated with a motion planning system that executes on the cloud platform;

sending, by the industrial device, feedback information to the motion planning system via the cloud platform, the feedback information indicating a current state of a motion device controlled by the industrial device;

receiving, by the industrial device from the cloud platform, a coarse interpolated motion profile generated by the motion planning system based on the feedback information, wherein the coarse interpolated motion profile defines a trajectory of the motion device as a set of time-series position values or velocity values having a first update rate;

adding, by the industrial device, interpolated position values or velocity values between the set of time-series position values or velocity values to yield a final motion profile comprising an updated set of time-series position values having a second update rate that is greater than the first update rate; and controlling motion of the motion device based on the final motion profile.

13. The method of claim 12, wherein the synchronizing comprises synchronizing the internal clock with the cloud clock based on at least one of a synchronization signal received from the cloud platform or a synchronization service that runs on the industrial device.

14. The method of claim 12, further comprising:
applying a time stamp to industrial data received or generated by the industrial device based on the internal clock yielding time-stamped data; and
sending the time-stamped data to the cloud platform.

15. The method of claim 14, wherein the time stamp comprises a coordinated universal time (UTC) stamp.

16. The method of claim 14, wherein the time stamp comprises time zone information indicating a local time zone of the industrial device.

17. The method of claim 14, further comprising appending, by the industrial device, contextual metadata to the industrial data.

18. The method of claim 17, wherein the appending comprises appending at least one of a production shift identifier, a production area identifier, a product identifier, a machine state, an employee identifier, a lot number, an active alarm, or a hierarchical organizational tag.

19. The method of claim 14, further comprising filtering the time-stamped data prior to the sending based on at least one filtering criterion.

20. The method of claim 19, wherein the filtering comprises at least one of:
discarding data values that are outside a defined data range, discarding redundant data values, or
discarding extra data values to yield a set of industrial data that conforms to a defined data frequency.

21. The method of claim 14, wherein the sending comprises sending the time-stamped data to a cloud-based application residing on the cloud platform, the cloud-based application comprising at least one of a data analysis application, a notification application, a business intelligence application, a visualization application, a reporting application, a storage application, a manufacturing execution system (MES), or an enterprise resource planning (ERP) application.

22. The method of claim 14, further comprising combining a first subset of the time-stamped data received from a first data source and a second subset of the time-stamped data received from a second data source into a chronological data set.

23. A non-transitory computer-readable medium having stored thereon instructions that, in response to execution, cause a computing system to perform operations, the operations comprising:
communicatively coupling an industrial device to a cloud platform;
synchronizing an internal clock of the industrial device with a master clock associated with a motion planning system executing on the cloud platform;
sending feedback information generated by the industrial device to the motion planning system via the cloud platform, wherein the feedback information indicates a current state of an industrial motion device controlled by the industrial device;
receiving, from the cloud platform, a coarse interpolated motion profile generated by the motion planning system based on the feedback information, wherein the coarse interpolated motion profile defines a trajectory as a set of position or velocity values over time at a first update rate;
interpolating additional position or velocity values between the set of position or velocity values to yield a final motion profile comprising an updated set of position or velocity values over time at a second update rate greater than the first update rate; and
controlling motion of the industrial motion device in accordance with the final motion profile.

24. The non-transitory computer-readable medium of claim 23, wherein the synchronizing comprises at least one of synchronizing the internal clock with the master clock based on a synchronization signal received from the cloud platform or synchronizing the internal clock using a synchronization service running on the industrial device.

25. The non-transitory computer-readable medium of claim 23, the operations further comprising:
time-stamping industrial data received or generated at the industrial device using a time provided by the internal clock to yield time-stamped data; and
sending the time-stamped data to a cloud-based application executing on the cloud platform.

26. The non-transitory computer-readable medium of claim 25, wherein the sending the time-stamped data comprises sending the time-stamped data including a coordinated universal time (UTC) stamp.

27. The non-transitory computer-readable medium of claim 25, the operations further comprising appending context information to the industrial data specifying a context of the industrial data.

28. The non-transitory computer-readable medium of claim 25, the operations further comprising:
determining a specified data resolution defined in a filtering profile; and
discarding a subset of the time-stamped data to yield filtered time-stamped data that conforms to the specified data resolution.

* * * * *